United States Patent
Agiwal et al.

(10) Patent No.: US 10,756,871 B2
(45) Date of Patent: *Aug. 25, 2020

(54) METHOD AND APPARATUS FOR COMMUNICATING DOWNLINK CONTROL INFORMATION IN AN ASYMMETRIC MULTICARRIER COMMUNICATION NETWORK ENVIRONMENT

(71) Applicant: Samsung Electronics Co., Ltd., Suwon-si, Gyeonggi-do (KR)

(72) Inventors: Anil Agiwal, Bangalore (IN); Anshuman Nigam, Bangalore (IN); Young-Bin Chang, Anyang-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

This patent is subject to a terminal disclaimer.

(21) Appl. No.: 15/477,760

(22) Filed: Apr. 3, 2017

(65) Prior Publication Data

US 2017/0208620 A1    Jul. 20, 2017

Related U.S. Application Data

(63) Continuation of application No. 14/020,226, filed on Sep. 6, 2013, now Pat. No. 10,033,504.

(30) Foreign Application Priority Data

Sep. 6, 2012    (IN) .......................... 3694/CHE/2012
Aug. 19, 2013   (IN) .......................... 3694/CHE/2012

(51) Int. Cl.
*H04L 5/00*    (2006.01)
*H04L 1/00*    (2006.01)
(Continued)

(52) U.S. Cl.
CPC .......... *H04L 5/0053* (2013.01); *H04L 1/0031* (2013.01); *H04L 5/001* (2013.01);
(Continued)

(58) Field of Classification Search
None
See application file for complete search history.

(56) References Cited

U.S. PATENT DOCUMENTS 8,848,641 B2    9/2014    Fong et al.
2010/0227569 A1   9/2010   Bala et al.
(Continued)

FOREIGN PATENT DOCUMENTS

CN    101651996 A    2/2010
KR    10-2011-0109812 A    10/2011

OTHER PUBLICATIONS

Yong Zhang, et al., "Cognition Radiation and Cognition Network", May 31, 2012, pp. 80-83.
(Continued)

*Primary Examiner* — Gregory B Sefcheck
*Assistant Examiner* — Suk Jin Kang
(74) *Attorney, Agent, or Firm* — Jefferson IP Law, LLP

(57) ABSTRACT

A method for communicating Downlink Control Information (DCI) in an asymmetric multicarrier communication network environment, the method comprising: determining a carrier type corresponding to DCI to be transmitted to a mobile station from a plurality of carrier types, encoding the DCI in a DCI format, wherein the DCI format comprises a set of fields corresponding to the determined carrier type, and transmitting the DCI encoded in the DCI format to the mobile station through a downlink control channel on a primary carrier, wherein the DCI format comprises a carrier
(Continued)

index field indicating type of the fields in the DCI format encoding the DCI and the carrier type corresponding to the encoded DCI.

20 Claims, 21 Drawing Sheets

(51) Int. Cl.
  *H04W 48/12* (2009.01)
  *H04W 72/04* (2009.01)
  *H04W 72/12* (2009.01)
(52) U.S. Cl.
  CPC .......... *H04L 5/0041* (2013.01); *H04L 5/0092* (2013.01); *H04W 48/12* (2013.01); *H04W 72/042* (2013.01); *H04W 72/1289* (2013.01); *H04L 1/0061* (2013.01)

(56) References Cited

U.S. PATENT DOCUMENTS

| | | | |
|---|---|---|---|
| 2010/0232382 A1 | 9/2010 | Gauvreau et al. | |
| 2010/0254268 A1 | 10/2010 | Kim et al. | |
| 2011/0070845 A1 | 3/2011 | Chen et al. | |
| 2011/0149894 A1 | 6/2011 | Luo et al. | |
| 2011/0228732 A1 | 9/2011 | Luo et al. | |
| 2011/0250918 A1 | 10/2011 | Jen | |
| 2011/0274061 A1 | 11/2011 | Li | |
| 2011/0274066 A1* | 11/2011 | Tee | H04L 5/001 370/329 |
| 2011/0299489 A1 | 12/2011 | Kim et al. | |
| 2012/0009923 A1 | 1/2012 | Chen et al. | |
| 2012/0033627 A1 | 2/2012 | Li et al. | |
| 2012/0044921 A1* | 2/2012 | Chung | H04J 11/0069 370/338 |
| 2012/0113941 A1 | 5/2012 | Chung et al. | |
| 2012/0201191 A1 | 8/2012 | Seo et al. | |
| 2012/0207103 A1 | 8/2012 | Dai et al. | |
| 2012/0207123 A1 | 8/2012 | Seo et al. | |
| 2012/0243498 A1 | 9/2012 | Kwon et al. | |
| 2012/0294272 A1 | 11/2012 | Han et al. | |
| 2012/0314675 A1 | 12/2012 | Vujcic | |
| 2013/0003664 A1 | 1/2013 | Frenne et al. | |
| 2013/0016672 A1 | 1/2013 | Yang et al. | |
| 2013/0028149 A1 | 1/2013 | Chen et al. | |
| 2013/0039284 A1 | 2/2013 | Marinier et al. | |
| 2013/0064190 A1 | 3/2013 | Hariharan et al. | |
| 2013/0114528 A1 | 5/2013 | Chen et al. | |
| 2013/0128838 A1 | 5/2013 | Montojo et al. | |
| 2013/0163525 A1 | 6/2013 | Moon et al. | |
| 2013/0176952 A1 | 7/2013 | Shin et al. | |
| 2013/0194931 A1 | 8/2013 | Lee et al. | |
| 2013/0242882 A1 | 9/2013 | Blankenship et al. | |
| 2013/0272259 A1* | 10/2013 | Kim | H04L 5/001 370/329 |
| 2013/0279462 A1* | 10/2013 | He | H04W 72/042 370/329 |
| 2014/0153539 A1 | 6/2014 | Seo et al. | |
| 2014/0179328 A1 | 6/2014 | Bala et al. | |
| 2014/0348090 A1* | 11/2014 | Nguyen | H04W 72/042 370/329 |
| 2015/0016408 A1 | 1/2015 | Yang et al. | |
| 2015/0023285 A1 | 1/2015 | Gauvreau et al. | |
| 2015/0029886 A1 | 1/2015 | Seo et al. | |
| 2015/0124724 A1* | 5/2015 | Yang | H04L 5/0028 370/329 |
| 2015/0163798 A1 | 6/2015 | Kwon et al. | |
| 2016/0065333 A1* | 3/2016 | Blankenship | H04W 72/042 370/329 |
| 2016/0105875 A1* | 4/2016 | Liu | H04W 72/042 370/329 |
| 2016/0165610 A1* | 6/2016 | Chung | H04J 11/0069 370/329 |
| 2017/0034828 A1* | 2/2017 | Tee | H04L 5/001 |
| 2017/0086173 A1* | 3/2017 | He | H04W 4/70 |
| 2017/0086220 A1* | 3/2017 | Kim | H04L 5/0007 |
| 2017/0251477 A1* | 8/2017 | Chung | H04J 11/0069 |
| 2018/0054808 A1* | 2/2018 | Pan | H04L 5/001 |
| 2018/0160428 A1* | 6/2018 | Tee | H04L 5/001 |
| 2018/0176907 A1* | 6/2018 | You | H04L 1/1861 |

OTHER PUBLICATIONS

Huawei: "Issues on Cross-Carrier PDCCH Indicaiton for Carrier Aggregation", 3GPP Draft; R1-093047 Issues on Cross-Carrier PDCCH Indication for Carrier Aggregation, 3rd Generation Partnership Project (3GPP), Mobile Competence Centre;XP050351439, Aug. 18, 2009.
Huawei, Hisilicon, "Control Signaling for Additional Carrier Types", R1-120021, 3GPP TSG RAN WG1 meeting #68, Feb. 6-10, 2012, Dresden, Germany.
Huawei, Hisilicon, "Control Signaling for Additional Carrier Types", R1-121494, GPP TSG RAN WG1 meeting #68bis, Mar. 26-30, 2012, Jeju, Korea.

* cited by examiner

```
CARRIER INDEX;
IF (CARRIER INDEX CORRESPONDS TO ASYMMETRIC SECONDARY CARRIER)
{
NEW FIELDS;
} ELSE
{
LEGACY FIELDS;
}
```

| CARRIER INDEX | RESOURCE ALLOCATION TYPE | RESOURCE BLOCK ASSIGNMENT | MODULATION AND CODING SCHEME | REDUNDANCY VERSION | NEW DATA INDICATOR | HARQ PROCESS NUMBER | POWER CONTROL COMMAND |
|---|---|---|---|---|---|---|---|

FIG.4C

| NUMBER OF DOWNLINK BURST | RESOURCE ALLOCATION TYPE | TRANSMISSION TYPE | HYBRID ARQ PARAMETERS | MODULATION AND CODING SCHEME | BEAMFORMING INFORMATION | BASE STATION INFORMATION |
|---|---|---|---|---|---|---|
| 452 | 454 | 456 | 458 | 460 | 462 | 464 |

METHOD AND APPARATUS FOR COMMUNICATING DOWNLINK CONTROL INFORMATION IN AN ASYMMETRIC MULTICARRIER COMMUNICATION NETWORK ENVIRONMENT

CROSS-REFERENCE TO RELATED APPLICATION(S)

This application is a continuation application of prior application Ser. No. 14/020,226, filed on Sep. 6, 2013, which claims the benefit under 35 U.S.C. § 119(a) of an Indian patent application filed on Sep. 6, 2012 and assigned Serial No. IN 3694/CHE/2012 in the Indian Patent Office and an Indian patent application filed on Aug. 19, 2013 in the Indian Patent Office and assigned Serial No. IN 3694/CHE/2012, the entire disclosure of each of which is hereby incorporated by reference.

TECHNICAL FIELD

The present disclosure relates to a wireless communication system. More particularly, the present disclosure relates to a method and an apparatus for communicating downlink control information in an asymmetric multicarrier communication network environment.

BACKGROUND

In recent years, several broadband wireless technologies have been developed to meet growing number of broadband subscribers and to provide more and better applications and services. For example, the 3$^{rd}$ Generation Partnership Project 2 (3GPP2) developed Code Division Multiple Access 2000 (CDMA 2000), 1× Evolution Data Optimized (1× EVDO) and Ultra Mobile Broadband (UMB) systems. The 3GPP developed Wideband Code Division Multiple Access (WCDMA), High Speed Packet Access (HSPA), and Long Term Evolution (LTE) systems. The Institute of Electrical and Electronics Engineers (IEEE) developed Mobile Worldwide Interoperability for Microwave Access (WiMAX) systems. As more and more people become users of mobile communication systems and more and more services are provided over these systems, there is an increasing need for a mobile communication system with large capacity, high throughput, lower latency, and better reliability.

A Super Mobile Broadband (SMB) system based on millimeter waves, i.e., radio waves with wavelength in range of 1 millimeter (mm) to 10 mm, which corresponds to a radio frequency of 30 Gigahertz (GHz) to 300 GHz, is a candidate for next generation mobile communication technology as vast amount of spectrum is available in a millimeter Wave band. In general, an SMB network consists of multiple SMB Base Stations (BSs) that cover a geographic area. In order to ensure good coverage, SMB base stations need to be deployed with a higher density than macro-cellular base stations. In general, SMB base stations are recommended to be deployed roughly the same site-to-site distance as microcell or Pico-cell deployment in an urban environment. Typically, transmission and/or reception in an SMB system are based on narrow beams, which suppress the interference from neighboring SMB base stations and extend the range of an SMB link. However due to a high path loss, a heavy shadowing, and rain attenuation, reliable transmission at higher frequencies is one of the key issues that need to be overcome in order to make SMB system a practical reality.

Lower frequencies in a cellular band having robust link characteristics can be utilized with higher frequencies in an mmWave band to overcome reliability issues in the SMB system. In an asymmetric multicarrier communication network environment, a Mobile Station (MS) communicates with a BS using asymmetric multiband carriers consisting of at least one low frequency carrier in the cellular band and at least one high frequency carrier in the mmWave band. A primary carrier i.e., a carrier operating on low frequencies and a secondary carrier i.e., carrier operating on high frequencies may be transmitted by the same BS or a different BS. Since the transmission characteristics of low frequency carriers in the cellular band and high frequency carriers in the mmWave band are quite different, Transmission Time Intervals (TTIs) and frame structures for the primary carrier and the secondary carrier may not be same.

In an asymmetric multicarrier SMB network, a low frequency carrier in a cellular band can be used to signal resource allocation information for a high frequency carrier in an mmWave band for reliable signaling of the resource allocation information. Since, the bandwidth, frame structure, TTI and resource block design of the low frequency carrier is different from that of high frequency carrier, control information indicating the resource allocation for an MS is different for the low frequency carrier and the high frequency carrier.

For a low frequency carrier (e.g., an LTE carrier), fields for signaling resource allocation information are defined using Downlink Control Information (DCI) formats. Several DCI formats are currently used for signaling unicast resource allocation information for the low frequency carrier to the MS. Each of these DCI formats are distinguished from each other based on the size of each DCI format.

In a multicarrier network of the related art, unicast DCI encoded in one of the DCI formats is transmitted in a Physical Downlink Control Channel (PDCCH) of a primary carrier, wherein the DCI corresponds to unicast resource allocation information associated with an MS. Each PDCCH carries a single DCI encoded in one of the DCI formats for the primary carrier or the secondary carrier of the multicarrier network of the related art. The carrier for which the unicast DCI transmitted in the PDCCH is intended is indicated to the MS in a carrier index field of the DCI format encoding the unicast DCI. Each carrier assigned to the mobile station is identified by a distinct carrier index via the carrier index field in the DCI format. The PDCCH carrying the unicast DCI for the MS is a Cyclic Redundancy Check (CRC) masked with a unicast Cellular Radio Network Temporary Identifier (C-RNTI) assigned to the MS. Further, multiple PDCCHs may be transmitted in one scheduling interval of the primary carrier.

Typically, in the multicarrier network of the related art, unicast DCI intended for both the primary carrier and the secondary carrier is encoded in the same DCI format. This is possible as both the primary carrier and the secondary carrier are symmetric in nature from perspective of a resource block design, TTI, and frame structure. However, in an asymmetric multicarrier communication network, the DCI format defined for primary carrier cannot be used for secondary carrier as a resource block design, TTI, and frame structure is not the same for the primary carrier and the secondary carrier.

Therefore, a need exists for a method and an apparatus for communicating downlink control information in an asymmetric multicarrier communication network environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for communicating downlink control information in an asymmetric multicarrier communication network environment.

In accordance with an aspect of the present invention, there is provided a method for communicating Downlink Control Information (DCI) in an asymmetric multicarrier communication network environment, the method comprises determining a carrier type corresponding to DCI to be transmitted to a mobile station from a plurality of carrier types, encoding the DCI in a DCI format, wherein the DCI format comprises a set of fields corresponding to the determined carrier type, and transmitting the DCI encoded in the DCI format to the mobile station through a downlink control channel on a primary carrier, wherein the DCI format comprises a carrier index field indicating type of the fields in the DCI format encoding the DCI and the carrier type corresponding to the encoded DCI.

In accordance with an aspect of the present invention, there is provided an apparatus comprises a processor and a Downlink Control Information (DCI) communication module coupled to the processor, wherein the DCI communication module configured for determining a carrier type corresponding to DCI to be transmitted to a mobile station from a plurality of carrier types, encoding the DCI in a DCI format, wherein the DCI format comprises a set of fields corresponding to the determined carrier type and transmitting the DCI encoded in the DCI format to the mobile station through a downlink control channel on a primary carrier, wherein the DCI format comprises a carrier index field setting carrier index, wherein the carrier index indicating type of the fields in the DCI format, wherein the carrier index corresponding to the determined carrier type.

In accordance with another aspect of the present invention, there is provided a method for communicating Downlink Control Information (DCI) in an asymmetric multicarrier communication network environment, the method comprises determining a carrier type corresponding to DCI to be transmitted to a mobile station, encoding the DCI in a DCI format corresponding to the determined carrier type, generating a Cyclic Redundancy Check (CRC) value of a downlink control channel in which the encoded DCI is to be transmitted, masking the CRC value using one of a plurality of temporary mobile station identifiers corresponding to the determined carrier type and transmitting the encoded DCI with the masked CRC value in the downlink control channel to the mobile station on a primary carrier.

In accordance with another aspect of the present invention, there is provided an apparatus comprises a processor and a Downlink Control Information (DCI) communication module coupled to the processor, wherein the DCI communication module configured for determining a carrier type corresponding to DCI to be transmitted to a mobile station, encoding the DCI in a DCI format corresponding to the determined carrier type, generating a Cyclic Redundancy Check (CRC) value of a downlink control channel in which the encoded DCI is to be transmitted, masking the CRC value using one of a plurality of temporary mobile station identifiers corresponding to the determined carrier type and transmitting the encoded DCI with the masked CRC value in the downlink control channel to the mobile station on a primary carrier.

In accordance with further aspect of the present invention, there is provided a method for decoding Downlink Control Information (DCI) in an asymmetric multicarrier communication network environment, the method comprises receiving a downlink control channel carrying unicast DCI on a primary carrier, decoding the downlink control channel carrying the unicast DCI, determining whether the unicast DCI in the decoded downlink control channel corresponds to the asymmetric secondary carrier, processing the unicast DCI according to a DCI format comprising fields corresponding to the asymmetric secondary carrier, if the unicast DCI corresponds to the asymmetric secondary carrier and processing the unicast DCI according to a DCI format comprising fields corresponding to the primary carrier or the symmetric secondary carrier, if the unicast DCI does not correspond to the asymmetric secondary carrier.

In accordance with further aspect of the present invention, there is provided an apparatus comprises a processor and a Downlink Control Information (DCI) processing module coupled to the processor, wherein the memory includes a DCI processing module configured for receiving a downlink control channel carrying unicast DCI on a primary carrier, decoding the downlink control channel carrying the unicast DCI, determining whether the unicast DCI in the decoded downlink control channel corresponds to the asymmetric secondary carrier, processing the unicast DCI according to a DCI format comprising fields corresponding to the asymmetric secondary carrier, if the unicast DCI corresponds to the asymmetric secondary carrier and processing the unicast DCI according to a DCI format comprising fields corresponding to the primary carrier or the symmetric secondary carrier, if the unicast DCI does not correspond to the asymmetric secondary carrier.

In accordance with further still aspect of the present invention, there is provided a method for communicating Downlink Control Information (DCI) in an asymmetric communication network environment, the method comprises generating unicast DCI for transmitting the unicast DCI to a mobile station, transmitting a downlink control channel carrying the unicast DCI on a primary carrier in a first control region of a subframe, if the DCI corresponds to one of the primary carrier or a symmetric secondary carrier, and transmitting a downlink control channel carrying the unicast DCI on the primary carrier in a second control region, if the unicast DCI corresponds to the asymmetric secondary carrier.

In accordance with further still aspect of the present invention, there is provided an apparatus comprises a processor and a Downlink Control Information (DCI) communication module coupled to the processor, wherein the DCI communication module configured for generating unicast DCI for transmitting the unicast DCI to a mobile station, transmitting a downlink control channel carrying the unicast DCI on a primary carrier in a first control region of a subframe, if the DCI corresponds to one of the primary carrier or a symmetric secondary carrier and transmitting a downlink control channel carrying the unicast DCI on the primary carrier in a second control region, if the unicast DCI corresponds to the asymmetric secondary carrier.

In accordance with further still aspect of the present invention, there is provided a method for communicating Downlink Control Information (DCI) in an asymmetric communication network environment, the method comprises transmitting a first downlink control channel carrying a new DCI in a legacy Packet Data Control Channel (PDCCH) region on a primary carrier, wherein the new DCI indicates location of at least one control region in a downlink transport channel region of a subframe and transmitting a second downlink control channel carrying unicast DCI on a primary carrier in the control region of the downlink transport channel.

In accordance with further still aspect of the present invention, there is provided an apparatus comprises a processor and a Downlink Control Information (DCI) communication module coupled to the processor, wherein the DCI communication module configured for transmitting a first downlink control channel carrying a new DCI in a legacy Packet Data Control Channel (PDCCH) region on a primary carrier, wherein the new DCI indicates location of at least one control region in a downlink transport channel region of a subframe and transmitting a second downlink control channel carrying unicast DCI on a primary carrier in the control region of the downlink transport channel.

In accordance with further still aspect of the present invention, there is provided a method for communicating Downlink Control Information (DCI) in an asymmetric communication network, the method comprises generating unicast DCI for transmitting the unicast DCI to a mobile station, transmitting a downlink control channel carrying the unicast DCI on a primary carrier in a subframe in a radio frame, if the unicast DCI corresponds to one of the primary carrier and a symmetric secondary carrier, and transmitting a downlink control channel carrying the unicast DCI on the primary carrier in another subframe in a radio frame, if the unicast DCI corresponds to the asymmetric secondary carrier.

In accordance with further still aspect of the present invention, there is provided an apparatus comprises a processor and a Downlink Control Information (DCI) communication module coupled to the processor, wherein the DCI communication module configured for generating unicast DCI for transmitting the unicast DCI to a mobile station, transmitting a downlink control channel carrying the unicast DCI on a primary carrier in a subframe in a radio frame, if the unicast DCI corresponds to one of the primary carrier and a symmetric secondary carrier, and transmitting a downlink control channel carrying the unicast DCI on the primary carrier in another subframe in a radio frame, if the unicast DCI corresponds to the asymmetric secondary carrier.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4A is a schematic representation of a DCI format containing new fields corresponding to an asymmetric secondary carrier and legacy fields corresponding to a primary carrier and/or a symmetric secondary carrier according to an embodiment of the present disclosure.

FIG. 4B is a schematic representation of a DCI format containing fields corresponding to a primary carrier and/or a symmetric secondary carrier according to an embodiment of the present disclosure.

FIG. 4C is a schematic representation of a DCI format containing new fields corresponding to an asymmetric secondary carrier according to an embodiment of the present disclosure.

Throughout the drawings it should be noted that like reference numbers are used to depict the same or similar elements, features, and structures.

DETAILED DESCRIPTION

Figure 1A:
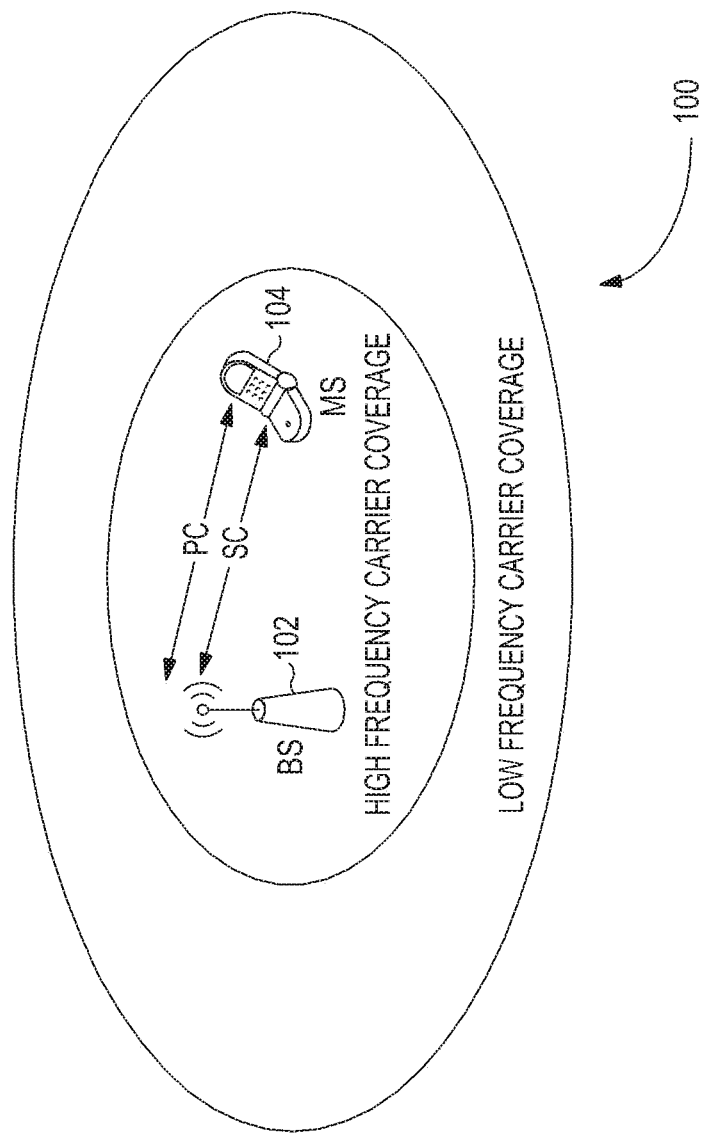
FIG. 1A is a schematic diagram depicting an asymmetric multicarrier communication network in which data on a primary carrier and a secondary carrier are transmitted by same base station according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure provides a method and a system for communicating downlink control information in an asymmetric multicarrier network environment. In the following description of various embodiments of the disclosure, reference is made to the accompanying drawings that form a part hereof, and in which are shown by way of illustration specific various embodiments in which the disclosure may be practiced. These various embodiments are described to enable those skilled in the art to practice the disclosure, and it is to be understood that other embodiments may be utilized and that changes may be made without departing from the scope of the present disclosure. The following description is, therefore, not to be taken in a limiting sense, and the scope of the present disclosure is defined by the appended claims.

In an asymmetric multicarrier communication network, a Mobile Station (MS) communicates with a base station using asymmetric secondary carriers consisting of at least one low frequency carrier in a cellular band and at least one high frequency carrier in a millimeter Wave band. The primary carrier, i.e., a carrier operating on low frequencies, is used to transmit control information including resource allocation information for a secondary carrier, i.e., a carrier operating on high frequencies. The primary carrier and the secondary carrier may be transmitted by the same Base Station (BS) or different BSs.

Figure 1B:
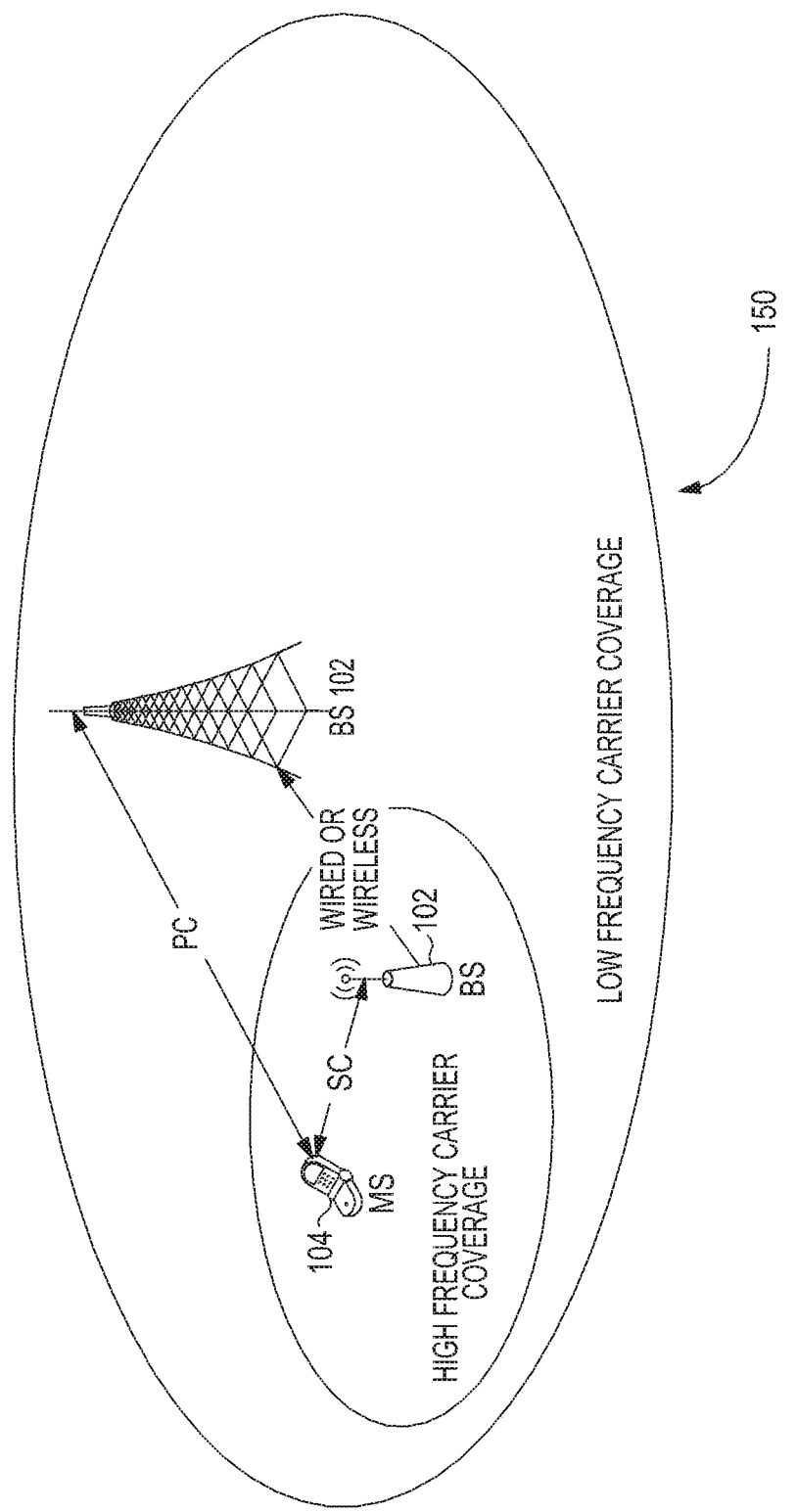
FIG. 1B is a schematic diagram depicting an asymmetric multicarrier communication network in which data on a primary carrier and a secondary carrier are transmitted by different Base Stations (BSs) according to an embodiment of the present disclosure.

FIG. 1A is a schematic diagram depicting an asymmetric multicarrier communication network in which data on a Primary Carrier (PC) and a Secondary Carrier (SC) are transmitted by same BS and FIG. 1B is a schematic diagram depicting an asymmetric multicarrier communication network in which data on a PC and an SC are transmitted by different BSs.

Referring to FIGS. 1A and 1B, a schematic diagram 100, a schematic diagram 150, BSs 102, and a mobile station 104 are illustrated. In asymmetric multicarrier communication network, resource block design, Transmit Time Intervals (TTIs) and frame structures for the primary carrier are different than those of the secondary carrier. The present disclosure is applicable to any asymmetric multicarrier communication network, wherein at least one of TTI and frame structures on a primary carrier are different than those of secondary carriers.

For the purpose explanation, a low frequency carrier operation as defined in the $3^{rd}$ Generation Partnership Project (3GPP) Long Term Evolution (LTE) system is considered. However, the present disclosure is equally applicable to any other cellular broadband system. Further, Downlink Control Information (DCI) is referred to in particular for resource allocation information, however the disclosure can be used for other types of DCI wherever applicable.

Figure 2:
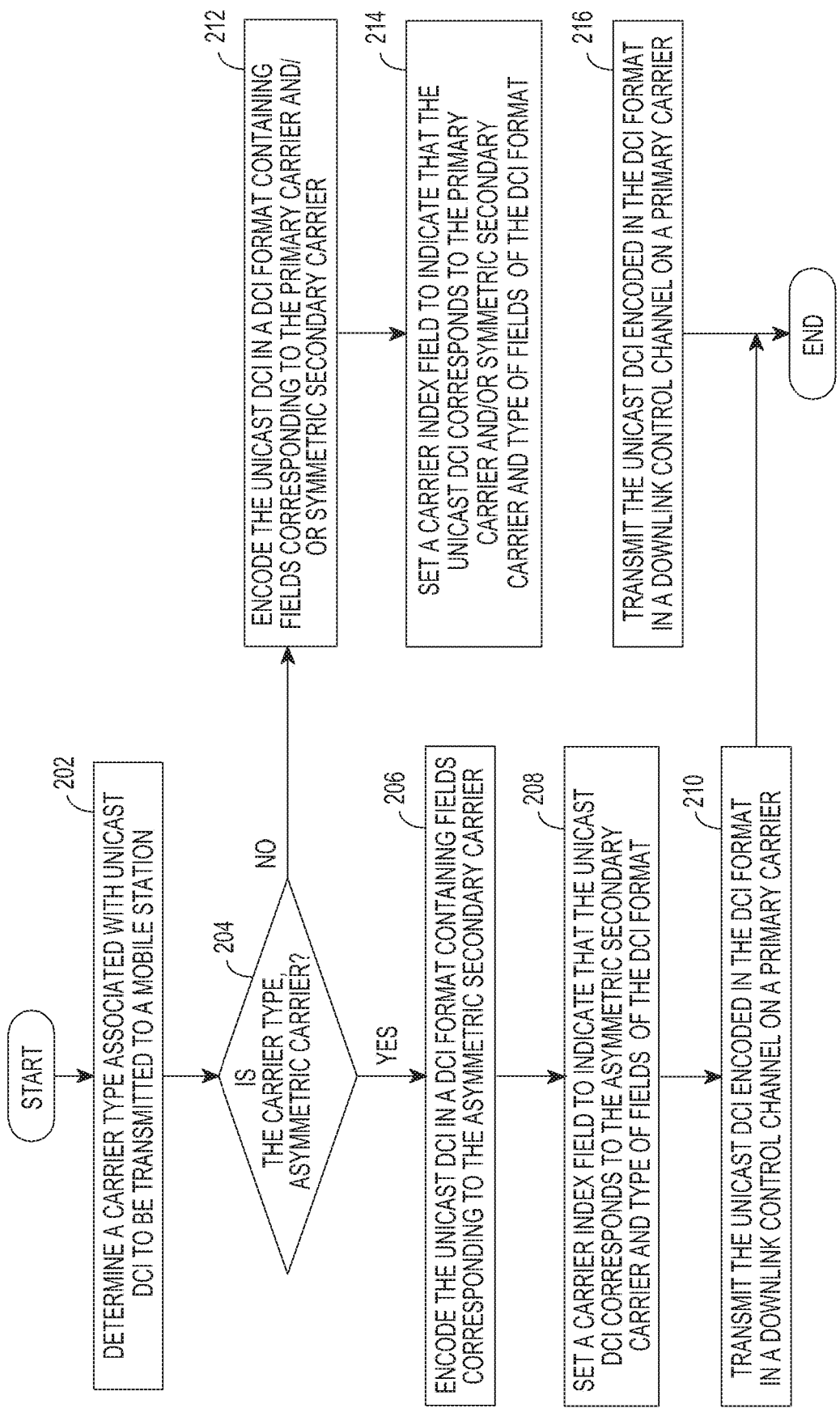
FIG. 2 is a flowchart illustrating a method of communicating unicast Downlink Control Information (DCI) in an asymmetric multicarrier communication network according to an embodiment of the present disclosure.

FIG. 2 is a flowchart illustrating a method of communicating unicast DCI in an asymmetric multicarrier communication network according to an embodiment of the present disclosure.

Referring to FIG. 2, when the base station 102 has to send unicast downlink control information indicating resources allocated to the mobile station 104, at operation 202, a carrier type associated with the unicast DCI to be transmitted to the mobile station 104 is determined. For example, the carrier type includes a primary carrier, a symmetric secondary carrier, and an asymmetric secondary carrier. For example, the symmetric secondary carrier is a carrier with a frame structure and operational parameters same as the primary carrier. On the contrary, the asymmetric secondary carrier is a carrier with a frame structure and operational parameters different than the primary carrier. The primary carrier and the symmetric secondary carrier may be carriers with operating frequency in a $3^{rd}$ Generation/$4^{th}$ Generation (3G/4G) cellular band whereas the asymmetric secondary carrier is a carrier with an operating frequency different from 3G/4G cellular band (e.g., a millimeter wave frequency band).

At operation 204, it is determined whether the determined carrier type is an asymmetric secondary carrier. If the carrier type is an asymmetric secondary carrier, at operation 206, the unicast DCI is encoded in a DCI format which contains fields corresponding to the asymmetric secondary carrier.

FIG. 4A is a schematic representation of a DCI format containing new fields corresponding to an asymmetric secondary carrier and legacy fields corresponding to a primary carrier and/or a symmetric secondary carrier according to an embodiment of the present disclosure. FIG. 4B is a schematic representation of a DCI format containing fields corresponding to a primary carrier and/or a symmetric secondary carrier according to an embodiment of the present disclosure. FIG. 4C is a schematic representation of a DCI format containing new fields corresponding to an asymmetric secondary carrier according to an embodiment of the present disclosure.

Referring to FIGS. 4A and 4B, a DCI format containing new fields corresponding to the asymmetric secondary carrier and legacy fields corresponding to the primary carrier and/or the symmetric secondary carrier is illustrated. In various embodiments, a unicast DCI format is defined for an asymmetric secondary carrier by adding new fields in a corresponding legacy unicast DCI format defined for a primary carrier and/or symmetric secondary carrier. The new fields are defined in such a way that sum of size of the new fields in the DCI format for the asymmetric secondary carrier is the same as the sum of size of fields in the legacy unicast DCI format for the primary carrier. It can be noted that, some of the fields defined for the asymmetric secondary carrier may be same as fields defined for the primary carrier and may have the same size. On the other hand, some of the fields defined for the asymmetric secondary carrier may be the same as fields defined for the primary carrier but may have a different size.

Referring to FIG. 4C, the new fields corresponding to the asymmetric secondary carrier are illustrated. The new fields includes a number of downlink bursts field 452, a resource allocation information field 454, a transmission type field 456, a Hybrid Automatic Repeat Request (HARQ) parameters field 458, a modulation and coding scheme field 460, a beamforming information field 462, and a base station information field 464. The number of downlink bursts field 452 indicates number of downlink bursts allocated in a downlink link interval. The resource allocation information field 454 indicates time and frequency information for the downlink burst in the downlink allocation interval. The resource allocation information 454 includes a transmit time interval number and a resource block size in terms of number of resource blocks.

The transmission type field 456 indicates type of transmission scheme used for transmission. For example, the transmission type may include a joint transmission, a dynamic point selection, and the like. The HARQ parameters field 458 includes a redundancy version, new data indicator, and a HARQ process number. The beamforming information field 462 indicates beamforming information for receiving downlink bursts. The beamforming information field 462 includes transmit beam IDentifiers (IDs) of TX-RX beam pair(s) for receiving downlink bursts. The base station information field 464 includes information associated with one or more base stations which are involved in a transmission of downlink burst.

Referring back to FIG. 2, at operation 208, a carrier index field is set to indicate that the unicast DCI corresponds to the asymmetric secondary carrier and type of fields of the DCI format in which the unicast DCI is encoded. In various embodiments of the present disclosure, the carrier index is set to index of the carrier whose DCI is encoded in the DCI format (i.e., an asymmetric secondary carrier). At operation 210, the unicast DCI encoded in the DCI format is transmitted in a downlink control channel (e.g., a Packet Data Control Channel (PDCCH)) on the primary carrier. In one implementation, a Cyclic Redundancy Check (CRC) of a PDCCH carrying the DCI encoded in the DCI format is masked using a temporary mobile station identifier (e.g., a unicast Cell-Radio Network Terminal Identifier (C-RNTI)) and the PDCCH is transmitted on the primary carrier. For example, the PDCCH is transmitted in a legacy PDCCH region of a subframe of a radio frame of the primary carrier.

If, at operation 204, it is determined that the carrier type is one of the primary carrier and the symmetric secondary carrier, at operation 212, the unicast DCI is encoded in a DCI format which contains fields corresponding to one of the primary carrier and the symmetric secondary carrier. At operation 214, a carrier index field is set to indicate that the unicast DCI corresponds to the primary carrier or the symmetric secondary carrier and type of fields of the DCI format in which the unicast DCI is encoded. At operation 216, the unicast DCI encoded in the DCI format is transmitted in the downlink control channel on the primary carrier. In one implementation, CRC of PDCCH is masked using the temporary mobile station identifier (e.g., a C-RNTI) and the PDCCH carrying the unicast DCI encoded in the DCI format is transmitted on the primary carrier.

Figure 3:
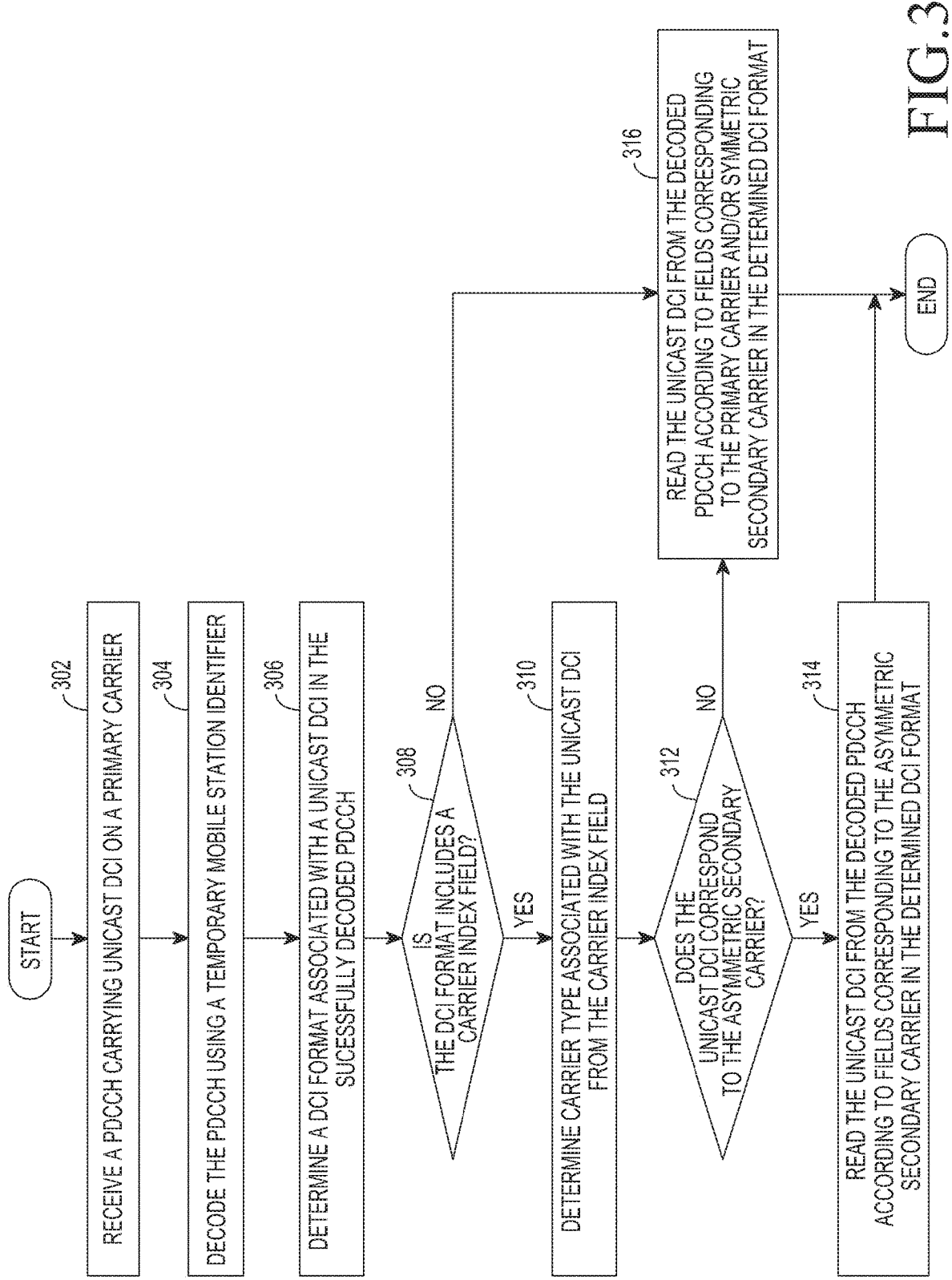
FIG. 3 is a flowchart illustrating a method of decoding unicast DCI received in a downlink control channel on a primary carrier according to an embodiment of the present disclosure.

FIG. 3 is a flowchart illustrating a method of decoding unicast DCI received in a downlink control channel on a primary carrier according to an embodiment of the present disclosure.

Referring to FIG. 3, at operation 302, a PDCCH carrying unicast DCI is received on the primary carrier. At operation 304, the PDCCH is decoded using a temporary mobile station identifier (e.g., a C-RNTI). At operation 306, a DCI format associated with the unicast DCI in the successfully decoded PDCCH is determined based on the size of information bits in the decoded PDCCH.

At operation 308, it is determined whether the DCI format includes carrier index field. If it is determined at operation 308 that the DCI format has the carrier index field, at operation 310, carrier type associated with the unicast DCI is determined from the carrier index field. In contrast, if it is determined at operation 308 that the DCI format does not include the carrier index field, operation 316 is performed.

At operation 312, it is determined whether the unicast DCI corresponds to asymmetric secondary carrier based on the determined carrier type. If it is determined at operation 312 that the unicast DCI corresponds to the asymmetric secondary carrier, at operation 314, the unicast DCI is read from the decoded PDCCH according to fields corresponding to the asymmetric secondary carrier in the determined DCI format. In contrast, if it is determined at operation 312 that the unicast DCI corresponds to the primary carrier or the symmetric secondary carrier, at operation 316, the unicast DCI is read from the decoded PDCCH according to fields corresponding to the primary carrier or the symmetric secondary carrier in the determined DCI format.

Figure 5:
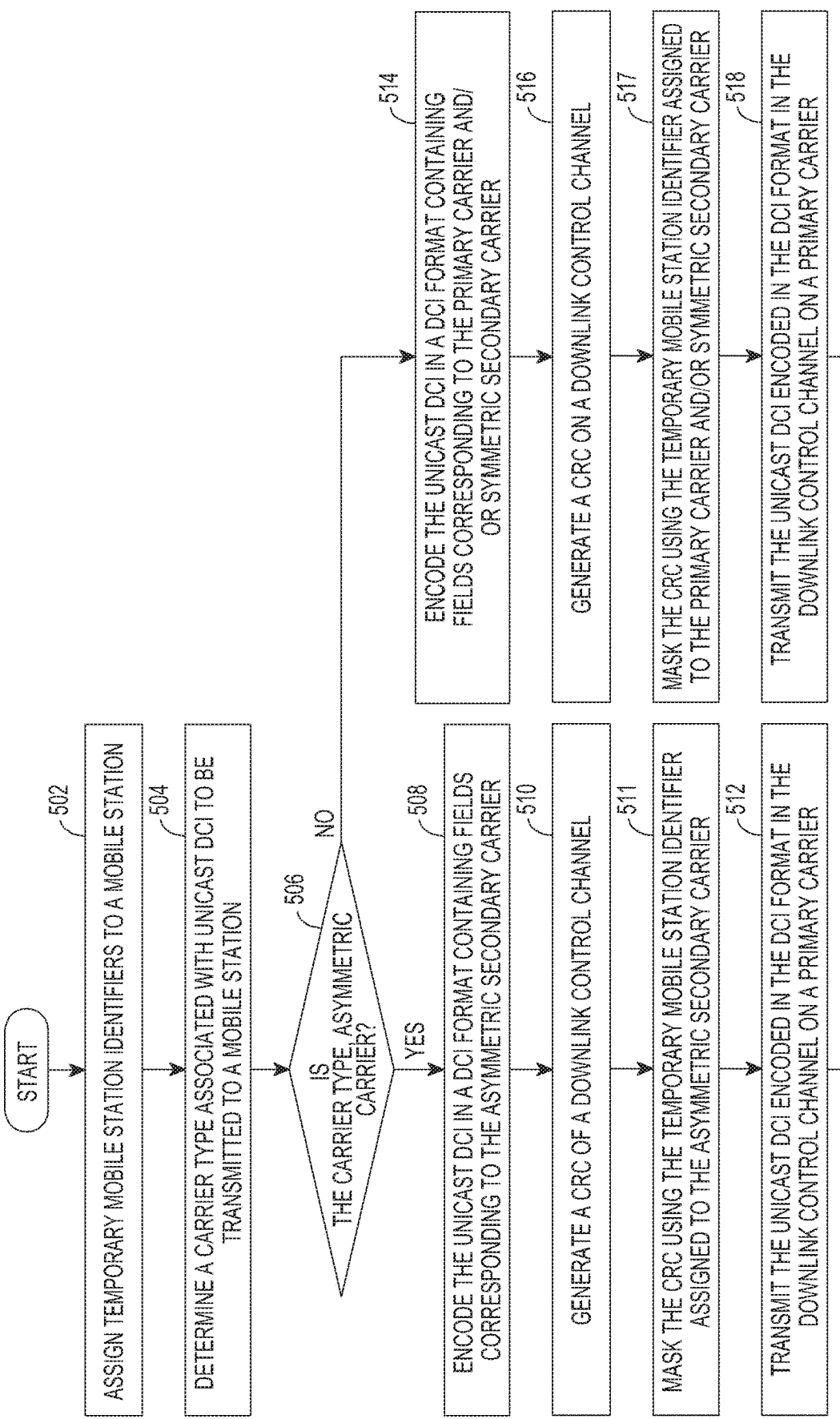
FIG. 5 is a flowchart illustrating a method of communicating unicast DCI in the asymmetric multicarrier communication network according to an embodiment of the present disclosure.

FIG. 5 is a flowchart illustrating a method of communicating unicast DCI in an asymmetric multicarrier communication network according to an embodiment of the present disclosure.

Referring to FIG. 5, at operation 502, temporary mobile station identifiers are assigned to the mobile station 104. Each temporary mobile station identifier is specific to carrier type. The carrier type includes a primary carrier, a symmetric secondary carrier, and an asymmetric secondary carrier. For example, a temporary mobile station identifier is assigned for communication on the primary carrier and/or symmetric secondary carrier and another temporary mobile station identifier is assigned for communication on the asymmetric secondary carrier. The temporary mobile station identifier for communication on the primary carrier and/or symmetric secondary carrier is assigned when the mobile station 104 registers with the asymmetric multicarrier communication network or when the connection is established with the base station 102.

The temporary mobile station identifier for communication on the asymmetric secondary carrier is assigned when the asymmetric secondary carrier is activated. Further temporary mobile station identifier for communication on the asymmetric secondary carrier is released when the asymmetric secondary carrier is deactivated. In case of a multi carrier operation with multiple asymmetric secondary carriers, a temporary mobile station identifier is assigned when the first asymmetric secondary carrier is activated and released when all the asymmetric secondary carriers are removed. It can be noted that the temporary mobile station identifier is not assigned upon activation of each asymmetric secondary carrier. The temporary mobile station identifiers may be a C-RNTI. If the mobile station 104 is assigned one primary carrier and multiple asymmetric secondary carriers, the mobile station 104 is assigned one $C\text{-}RNTI_{ASC}$ (C-RNTI for asymmetric secondary carrier(s)) in addition to $C\text{-}RNTI_{PC}$ (C-RNTI for primary or symmetric secondary carrier(s)).

When the base station 102 has to send unicast DCI indicating resources allocated to the mobile station 104, at operation 504, a carrier type associated with the unicast DCI to be transmitted to the mobile station 104 is determined. At operation 506, it is determined whether the determined carrier type is an asymmetric secondary carrier. If it is determined at operation 506 that the carrier type is the asymmetric secondary carrier, at operation 508, the unicast DCI is encoded in a DCI format corresponding to the asymmetric secondary carrier. The DCI format for the asymmetric secondary carrier consists of fields corresponding to the asymmetric secondary carrier. It can be noted that, one or more new unicast DCI formats for asymmetric secondary carriers are independently defined without considering size of legacy DCI formats. The multiple DCI formats for asymmetric secondary carrier may be distinguished from each other based on a different size of the DCI formats or based on a type field in each DCI format.

At operation 510, a CRC of a downlink control channel is generated. At operation 511, the CRC is masked using the temporary mobile station identifier assigned for the asymmetric secondary carrier (e.g., a C-RNTI assigned for the asymmetric secondary carrier). At operation 512, the unicast DCI encoded in the DCI format is transmitted in a downlink control channel (e.g., a PDCCH) on the primary carrier.

In contrast, if, at operation 506, it is determined that the carrier type is one of a primary carrier and a symmetric secondary carrier, at operation 514, the unicast DCI is encoded in a DCI format which contains fields corresponding to one of the primary carrier and the asymmetric secondary carrier. At operation 516, a CRC of the downlink control channel is generated. At operation 517, the CRC is masked using the temporary mobile station identifier assigned for the primary carrier (e.g., a unicast C-RNTI assigned for the primary carrier). At operation 518, the unicast DCI encoded in the DCI format is transmitted in a downlink control channel (e.g., a PDCCH) on the primary carrier.

Figure 6:
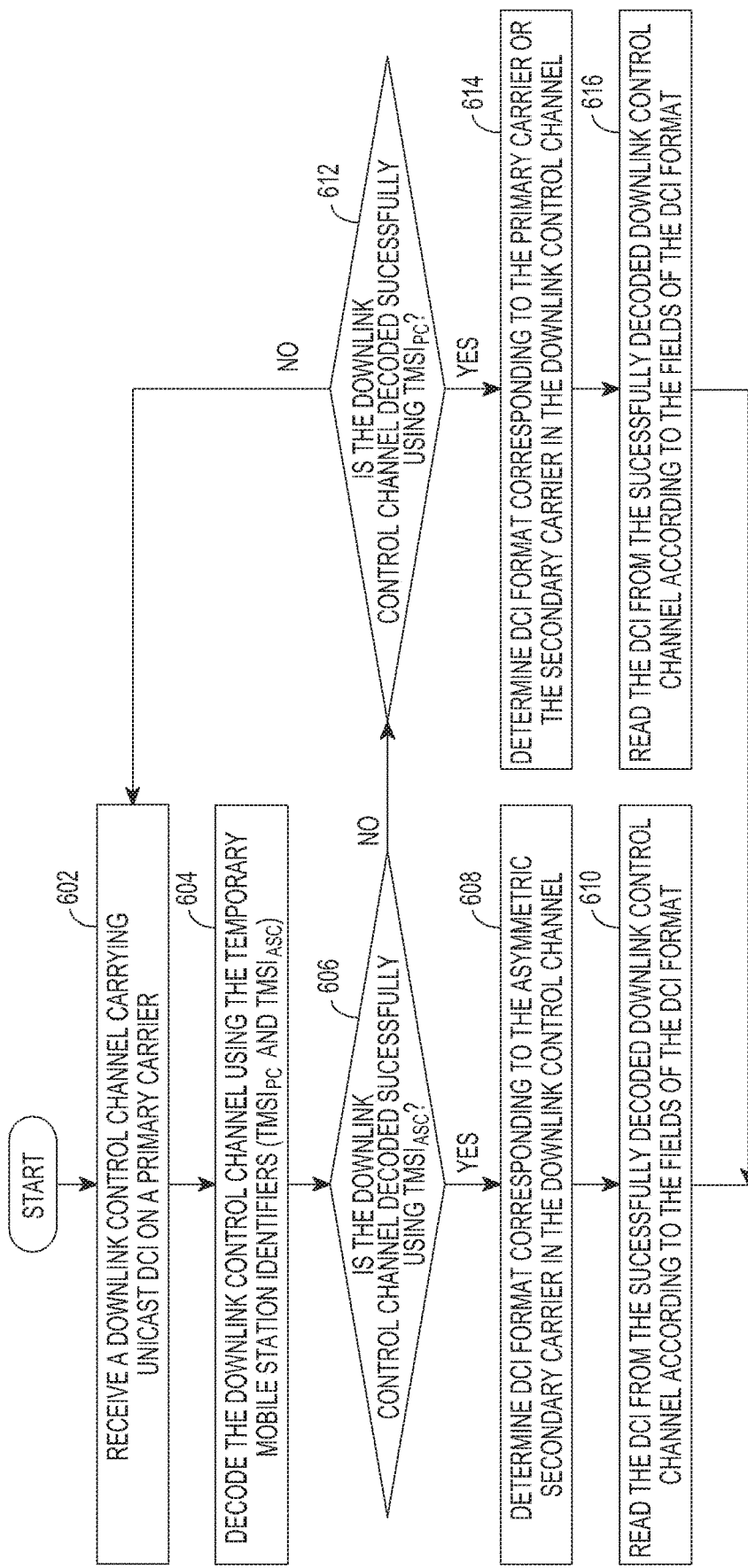
FIG. 6 is a flowchart illustrating a method of decoding unicast DCI received in a downlink control channel on a primary carrier according to an embodiment of the present disclosure.

FIG. 6 is a flowchart illustrating a method of decoding unicast DCI received in a downlink control channel on a primary carrier according to an embodiment of the present disclosure.

Referring to FIG. 6, at operation 602, a downlink control channel carrying unicast DCI is received on the primary carrier. At operation 604, the downlink control channel is decoded using the temporary mobile station identifiers assigned to the mobile station 104. At operation 606, it is determined whether the downlink control channel is successfully decoded using the Temporary Mobile Station Identifier assigned for the Asymmetric Secondary Carrier ($TMSI_{ASC}$). If it is determined at operation 606 that the downlink control channel is successfully decoded using the temporary mobile station identifier assigned for the asymmetric secondary carrier, at operation 608, the DCI format corresponding to the asymmetric secondary carrier in the successfully decoded downlink control channel is determined. At operation 610, the DCI in the successfully decoded downlink control channel is read according to the fields of the determined DCI format.

In contrast, if it is determined at operation 606 that the downlink control channel is not successfully decoded using the temporary mobile station identifier assigned for the asymmetric secondary carrier, at operation 612, it is determined whether the downlink control channel is successfully decoded using the TMSI assigned for the Primary Carrier ($TMSI_{PC}$). If it is determined at operation 612 that the downlink control channel is successfully decoded using the temporary mobile station identifier assigned for the primary carrier, at operation 614, the DCI format corresponding to the primary carrier or the symmetric secondary carrier in the successfully decoded downlink control channel is determined. At operation 616, the DCI in the successfully decoded downlink control channel is read according to the fields of the determined DCI format.

One skilled in the art will understand that the downlink control channel is first decoded using the $TMSI_{PC}$. If the downlink control channel is not successfully decoded, the downlink control channel is decoded using the $TMSI_{ASC}$.

Figure 7:
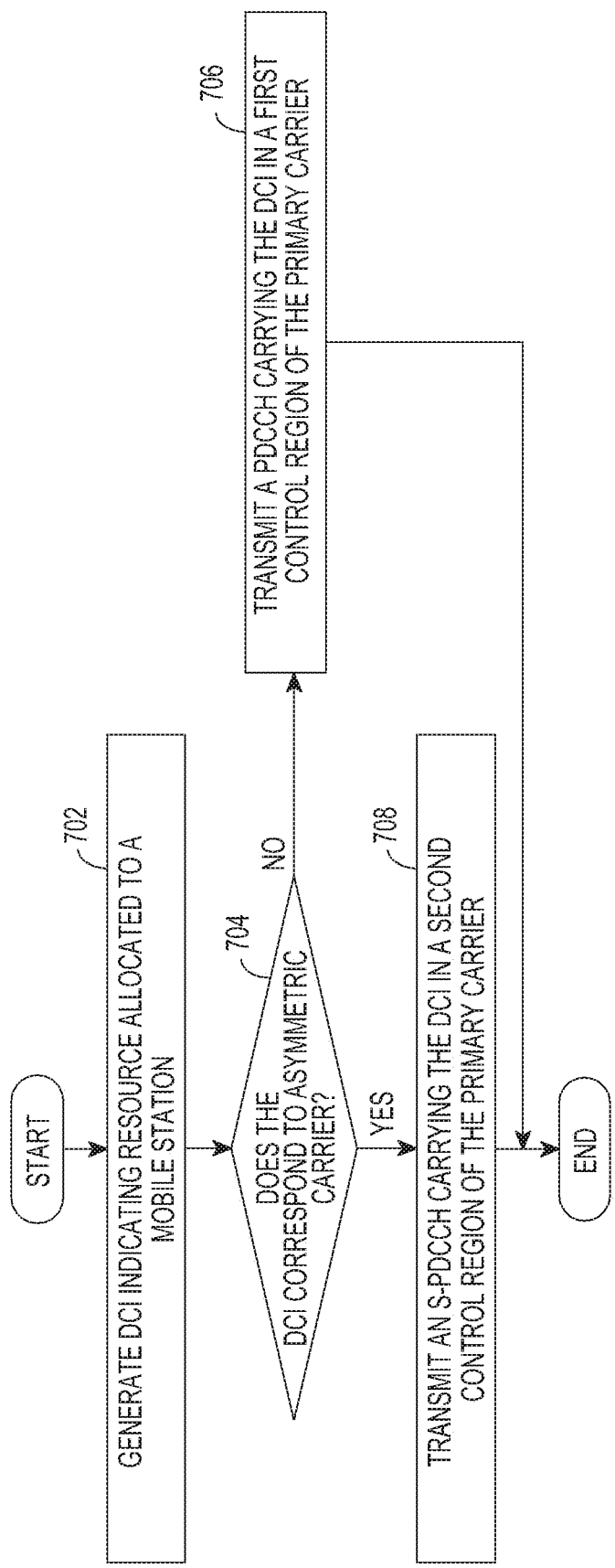
FIG. 7 is a flowchart illustrating a method of communicating unicast DCI in an asymmetric multicarrier communication network according to an embodiment of the present disclosure.

FIG. 7 is a flowchart illustrating a method of communicating unicast DCI in an asymmetric multicarrier communication network according to an embodiment of the present disclosure.

Referring to FIG. 7, at operation 702, DCI indicating resources allocated to the mobile station 104 is generated. At operation 704, it is determined whether the DCI corresponds to an asymmetric secondary carrier.

If the DCI does not correspond to the asymmetric secondary carrier, at operation 706, a PDCCH carrying the DCI is transmitted in a first control region of the primary carrier. If the DCI corresponds to the asymmetric secondary carrier, at operation 708, a Secondary-PDCCH (S-PDCCH) carrying the DCI is transmitted in a second control region of the primary carrier. The S-PDCCH is a PDCCH transmitted on a primary carrier and carrying the DCI encoded in one of DCI formats specifically defined for the asymmetric secondary carrier. Each S-PDCCH carries a single DCI. It is possible that, multiple S-PDCCHs can be transmitted in a single scheduling interval of a subframe. The DCI formats specifically defined for encoding the DCI differ from each other in size or type. The association of the first control region and the second control region with the primary carrier and/or the symmetric secondary carrier, and the asymmetric secondary carrier is fixed in the asymmetric multicarrier communication network. Alternatively, the association of the first control region and the second control region with the primary carrier and/or the symmetric secondary carrier, and asymmetric secondary carrier is signaled by the base station 102 to the mobile station 104 during activation of the asymmetric secondary carrier. By default, the primary carrier or the symmetric secondary carrier is associated with a legacy PDCCH region until the asymmetric secondary carrier is activated.

In one embodiment, the first control region is a legacy PDCCH region and the second control region is a DL-SCH region in each subframe of a radio frame.

Figure 8:
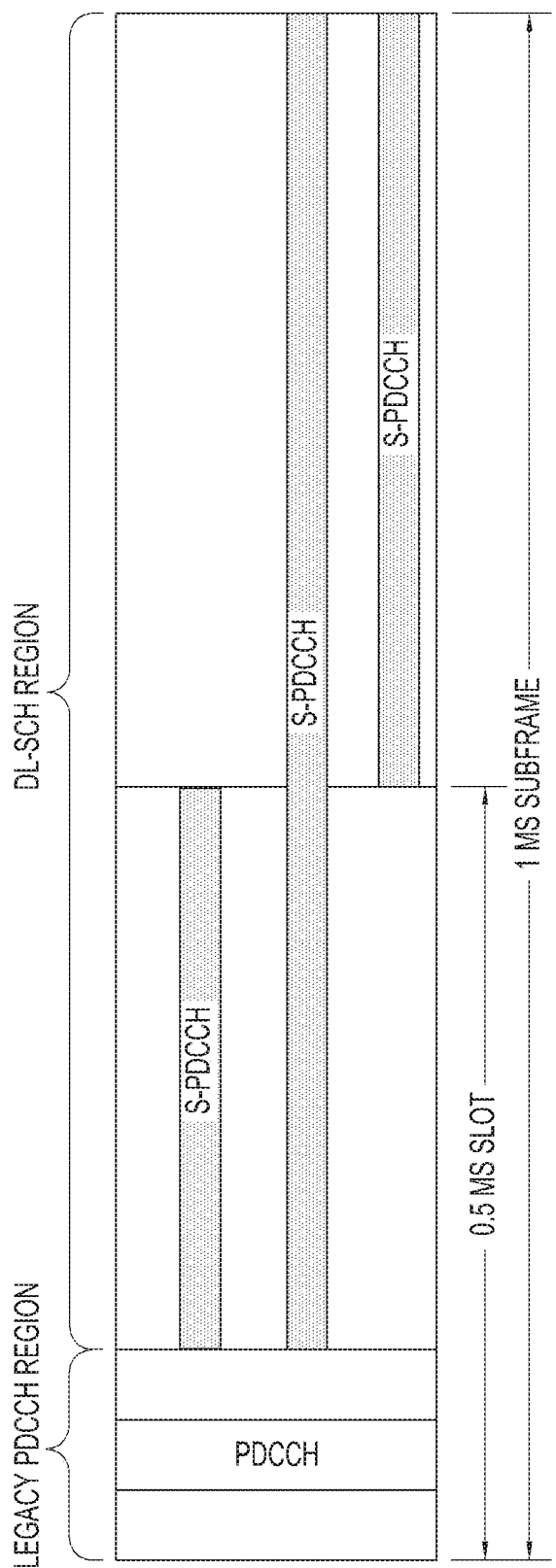
FIG. 8 is a schematic representation illustrating a transmission of a Packet Data Control Channel (PDCCH) and a Secondary-PDCCH (S-PDCCH) in a legacy PDCCH region and a DownLink-Secondary CHannel (DL-SCH) region, respectively, according to an embodiment of the present disclosure.

FIG. 8 is a schematic representation illustrating a transmission of a PDCCH and an S-PDCCH in a legacy PDCCH region and a DownLink-Secondary CHannel (DL-SCH) region, respectively, according to an embodiment of the present disclosure.

Referring to FIG. 8, the legacy PDCCH region is used for transmitting PDCCH carrying DCI corresponding to the primary carrier and/or the symmetric secondary carrier, whereas the DL-SCH region is used for transmitting S-PDCCH carrying DCI corresponding to the asymmetric secondary carrier. As can be seen from FIG. 8, the S-PDCCH carrying the DCI in the DL-SCH region may span one or more slots of each subframe. In one implementation, the location of the S-PDCCH may be pre-defined. In another implementation, the location of the S-PDCCH may be indicated to the mobile station 104 during addition of the asymmetric secondary carrier. In yet another implementation, the location of the S-PDCCH may be indicated using a DCI in a PDCCH transmitted in a legacy PDCCH region corresponding to the primary carrier. The PDCCH carrying the DCI which indicates location of the S-PDCCH may be CRC masked using C-RNTI assigned for the primary carrier. Alternatively, the PDCCH carrying the DCI which indicates location of the S-PDCCH may be CRC masked using C-RNTI assigned for the Asymmetric Secondary Carrier (C-RNTI$_{ASC}$).

Figure 9:
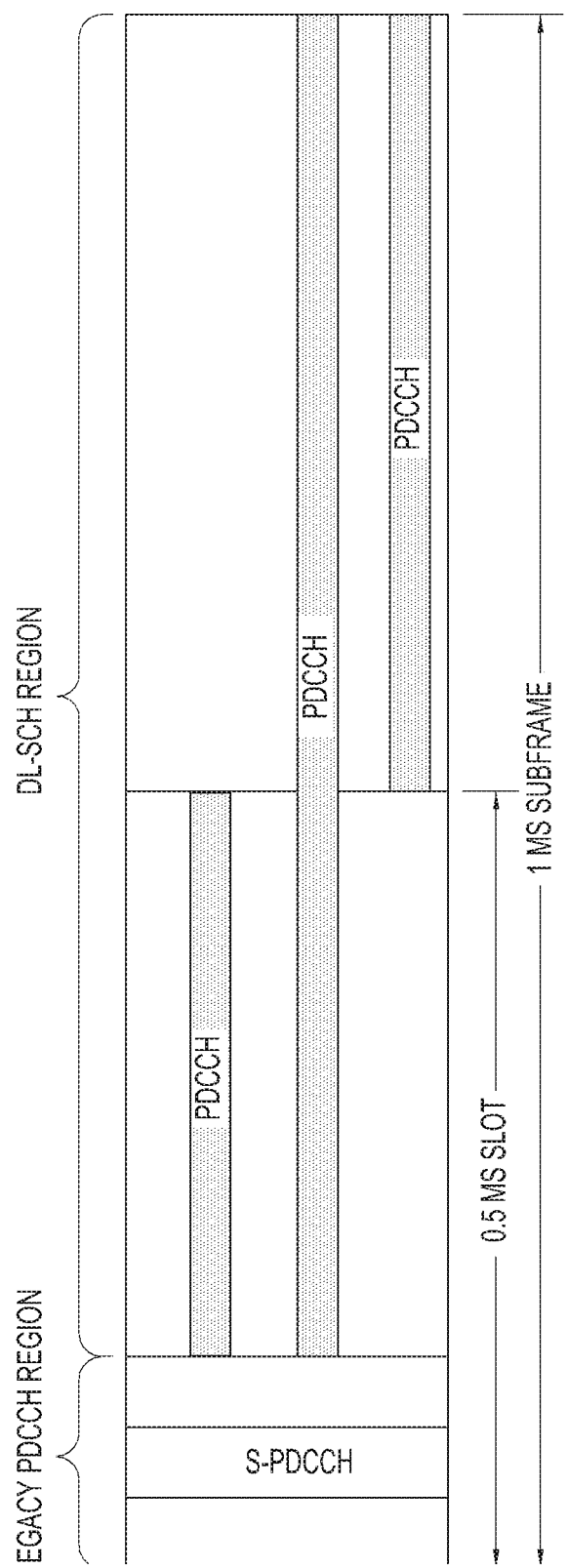
FIG. 9 is a schematic representation illustrating a transmission of an S-PDCCH and a PDCCH in a DL-SCH region and a legacy PDCCH region, respectively, according to an embodiment of the present disclosure.

FIG. 9 is a schematic representation illustrating a transmission of an S-PDCCH and a PDCCH in a DL-SCH region and a legacy PDCCH region, respectively, according to an embodiment of the present disclosure.

Referring to FIG. 9, the legacy PDCCH region is used for transmitting an S-PDCCH carrying DCI corresponding to the asymmetric secondary carrier, whereas the DL-SCH region is used for transmitting PDCCH carrying DCI corresponding to the primary carrier and/or the symmetric secondary carrier. As can be seen from FIG. 9, the PDCCH carrying the DCI in the DL-SCH region may span one or more slots of each subframe. In one implementation, the location of the PDCCH may be pre-defined. In another implementation, the location of the PDCCH may be indicated the mobile station 104 during addition of the asymmetric secondary carrier. In yet another implementation, the location of the PDCCH may be indicated using a DCI in the S-PDCCH transmitted in the legacy PDCCH region. The S-PDCCH carrying the DCI which indicates location of the PDCCH may be CRC masked using C-RNTI assigned for the primary carrier (C-RNTI$_{PC}$). Alternatively, the S-PDCCH carrying the DCI which indicates location of the PDCCH may be CRC masked using C-RNTI assigned for the C-RNTI$_{ASC}$.

Figure 10:
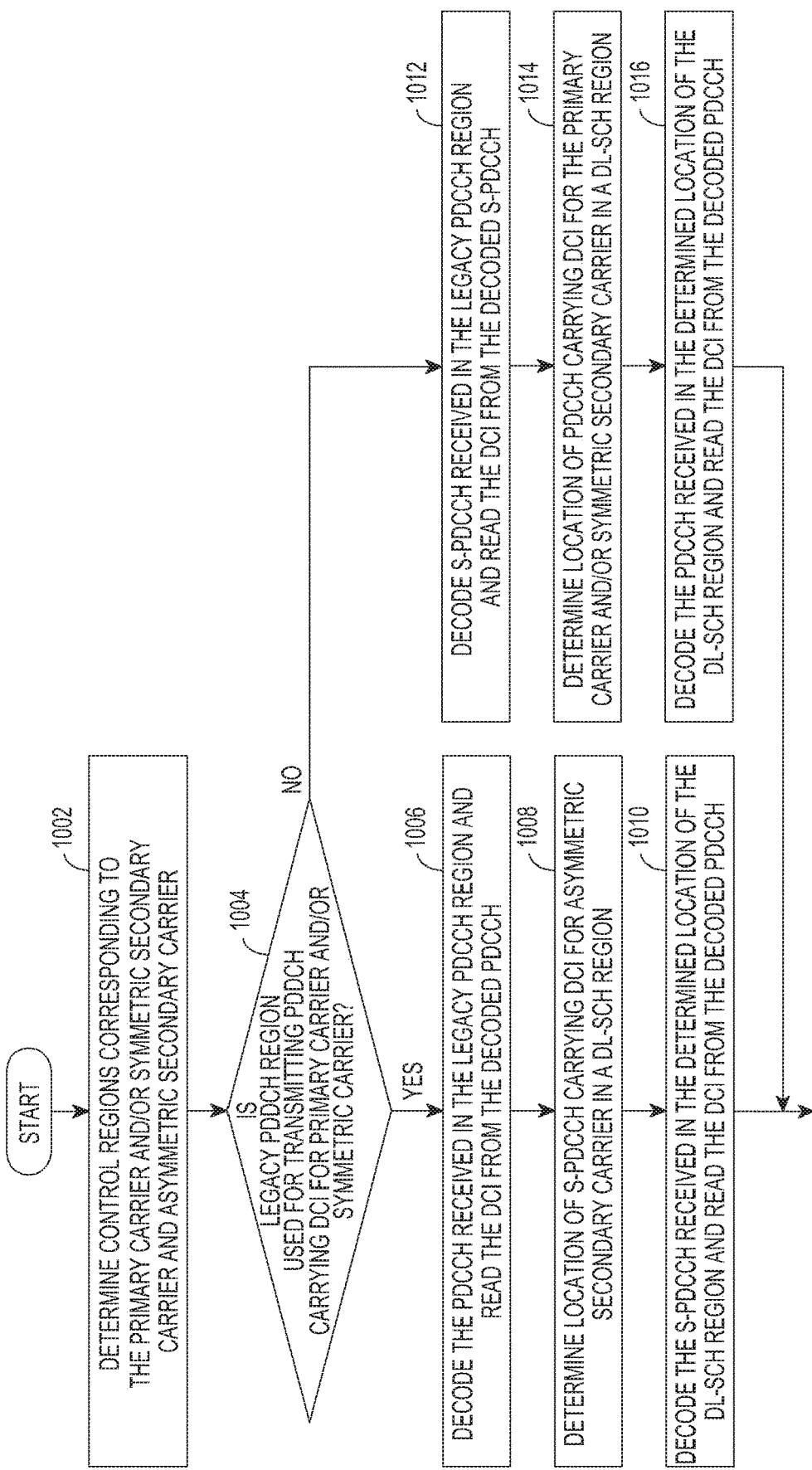
FIG. 10 is a flowchart illustrating a method of decoding unicast DCI received in a downlink control channel of a primary carrier according to an embodiment of the present disclosure.

FIG. 10 is a flowchart illustrating a method of decoding unicast DCI received in a downlink control channel of a primary carrier according to an embodiment of the present disclosure.

Referring to FIG. 10, at operation 1002, control regions corresponding to the primary carrier and/or symmetric secondary carrier, and the asymmetric secondary carrier in a subframe of a radio frame are determined. At operation 1004, it is determined whether a legacy PDCCH region in the subframe of the radio frame is used for transmitting PDCCH carrying unicast DCI for the primary carrier and/or the symmetric secondary carrier. If it is determined at operation 1004 that the legacy PDCCH region is used for transmitting PDCCH, at operation 1006, PDCCH transmitted in the legacy PDCCH region is decoded and DCI corresponding to the primary carrier and/or symmetric secondary carrier is read from the decoded PDCCH. At operation 1008, location of S-PDCCH carrying DCI for the asymmetric secondary carrier in a downlink transport channel region (e.g., a DL-SCH region) is determined. At operation 1010, the S-PDCCH received in the determined location of the DL-SCH region is decoded and DCI corresponding to the asymmetric secondary carrier is read from the decoded S-PDCCH.

In contrast, if it is determined at operation 1004 that the legacy PDCCH region is not used for transmitting PDCCH, at operation 1012, S-PDCCH transmitted in the legacy PDCCH region is decoded and DCI corresponding to the asymmetric secondary carrier is read from the decoded S-PDCCH. At operation 1014, location of PDCCH carrying DCI for the primary carrier and/or symmetric secondary carrier in a DL-SCH region is determined. At operation 1016, the PDCCH received in the determined location of the DL-SCH region is decoded and DCI corresponding to the primary carrier and/or symmetric secondary carrier is read from the decoded PDCCH.

In another embodiment, the first control region and the second control region are part of a DL-SCH region in each subframe of a radio frame.

Figure 11:
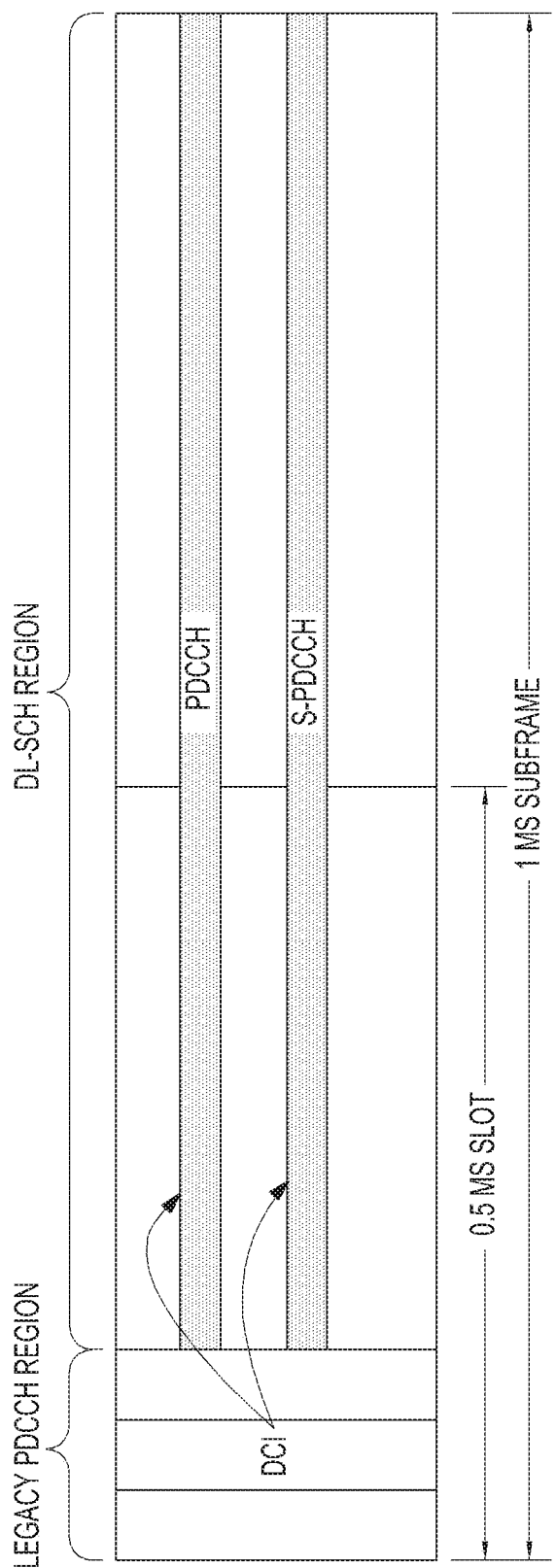
FIG. 11 is a schematic representation illustrating a transmission of a PDCCH and an S-PDCCH in a DL-SCH region according to an embodiment of the present disclosure.

FIG. 11 is a schematic representation illustrating a transmission of a PDCCH and an S-PDCCH in a DL-SCH region according to an embodiment of the present disclosure.

Referring to FIG. 11, the first control region is used for transmitting PDCCH carrying DCI corresponding to the primary carrier and/or the symmetric secondary carrier, whereas the second control region is used for transmitting an S-PDCCH carrying DCI corresponding to the asymmetric secondary carrier. It is to be noted that, in addition to the first control region in the DL-SCH region, PDCCH carrying the DCI corresponding to the primary carrier and/or the symmetric secondary carrier can also be transmitted in the legacy PDCCH region. As can be seen from FIG. 11, the first control region and the second control region may span one or more slots of each subframe.

The location of the PDCCH or S-PDCCH in the downlink transport channel region (e.g., a DL SCH region) may be indicated using a new DCI in a PDCCH transmitted in a legacy PDCCH region. For example, one bit in the new DCI indicates whether the first control region/second control region is reserved for transmitting PDCCH or S-PDCCH. Further, the PDCCH carrying the new DCI is a CRC masked using temporary mobile station identifier (e.g., a C-RNTI) for the primary carrier or temporary mobile station identifier (e.g., a C-RNTI) assigned to the asymmetric secondary carrier. Alternatively, the new DCI may indicate location for PDCCH/S-PDCCH in the downlink transport channel region (e.g., a DL-SCH region) but may not indicate whether PDCCH/S-PDCCH is present in the indicated location. In such case, PDCCH carrying DCI corresponding to the primary carrier and/or the symmetric secondary carrier is CRC masked using C-RNTI assigned to the primary carrier and S-PDCCH carrying DCI corresponding to the asymmetric secondary carrier is CRC masked using C-RNTI assigned to the asymmetric secondary carrier. Thus, the mobile station 104 can determine whether the information received in the DL-SCH region is PDCCH or S-PDCCH based on whether the received information is successfully decoded using the C-RNTI assigned to the primary carrier or the C-RNTI assigned to the asymmetric secondary carrier.

Figure 12:
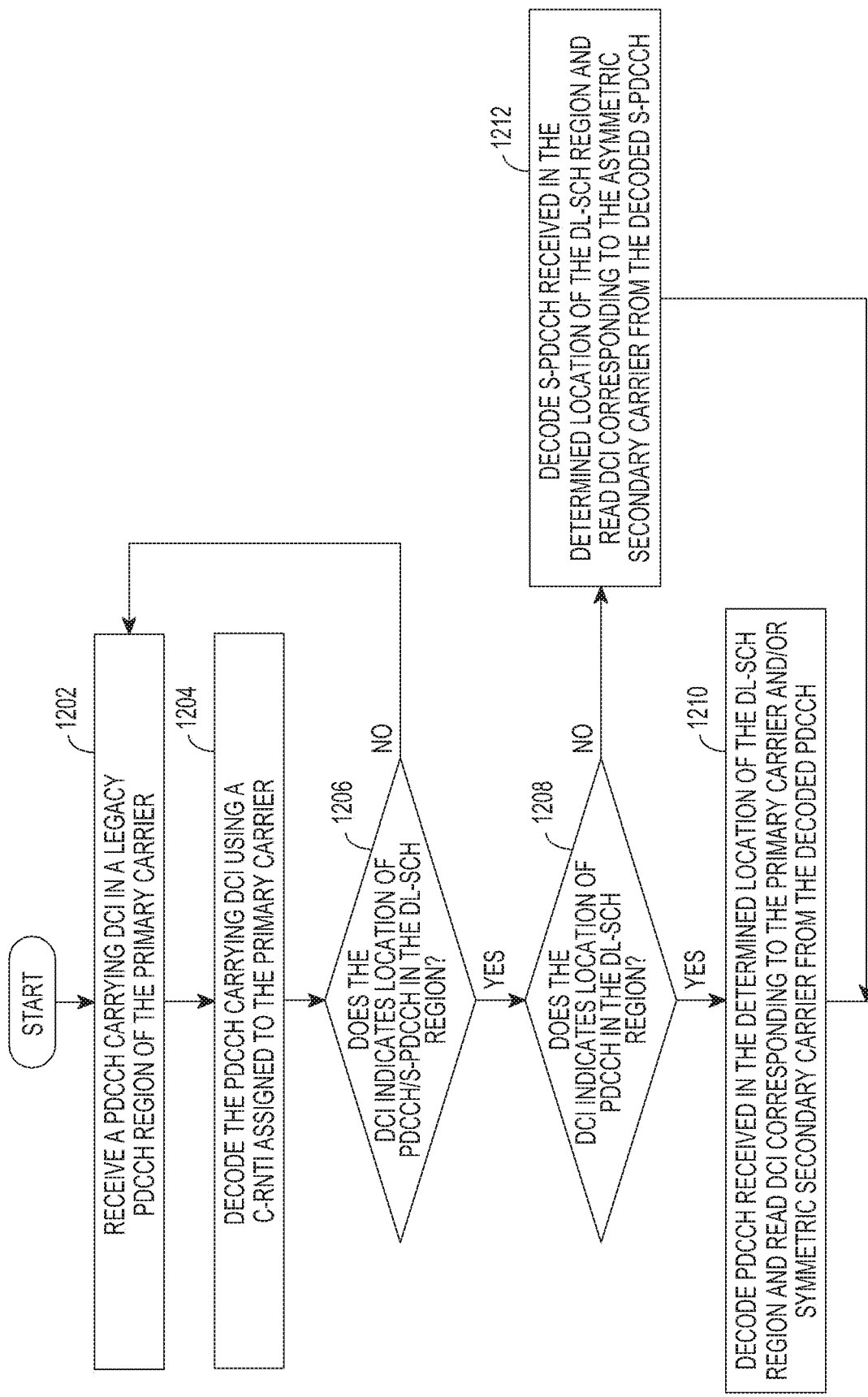
FIG. 12 is a flowchart illustrating a method of decoding unicast DCI received in a downlink control channel of a primary carrier according to an embodiment of the present disclosure.

FIG. 12 is a flowchart illustrating a method of decoding unicast DCI received in a downlink control channel of a primary carrier according to an embodiment of the present disclosure.

Referring to FIG. 12, at operation 1202, a PDCCH carrying unicast DCI is received in a legacy PDCCH region of a subframe of a radio frame on the primary carrier. At operation 1204, the PDCCH carrying the DCI is decoded using a temporary MS identifier (e.g., a C-RNTI) assigned to the primary carrier.

At operation 1206, it is determined whether the DCI in the decoded PDCCH indicates location of PDCCH/S-PDCCH in a DL-SCH region of the primary carrier. If it is determined at operation 1206 that the DCI indicates location of PDCCH/S-PDCCH in the DL-SCH region, at operation 1208, it is determined whether the DCI indicates the location of the PDCCH in the DL-SCH region. If it is determined at operation 1208 that the DCI does not indicate location of PDCCH/S-PDCCH, the process 1200 goes to operation 1202.

If the DCI indicates the location of the PDCCH, at operation 1210, PDCCH received in the determined location of the DL-SCH region is decoded and DCI corresponding to the primary carrier and/or the symmetric secondary carrier is read from the decoded PDCCH. If the DCI indicates the location of the S-PDCCH, at operation 1212, S-PDCCH received in the determined location of the DL-SCH region is decoded and DCI corresponding to the asymmetric secondary carrier is read from the decoded S-PDCCH.

Figure 13:
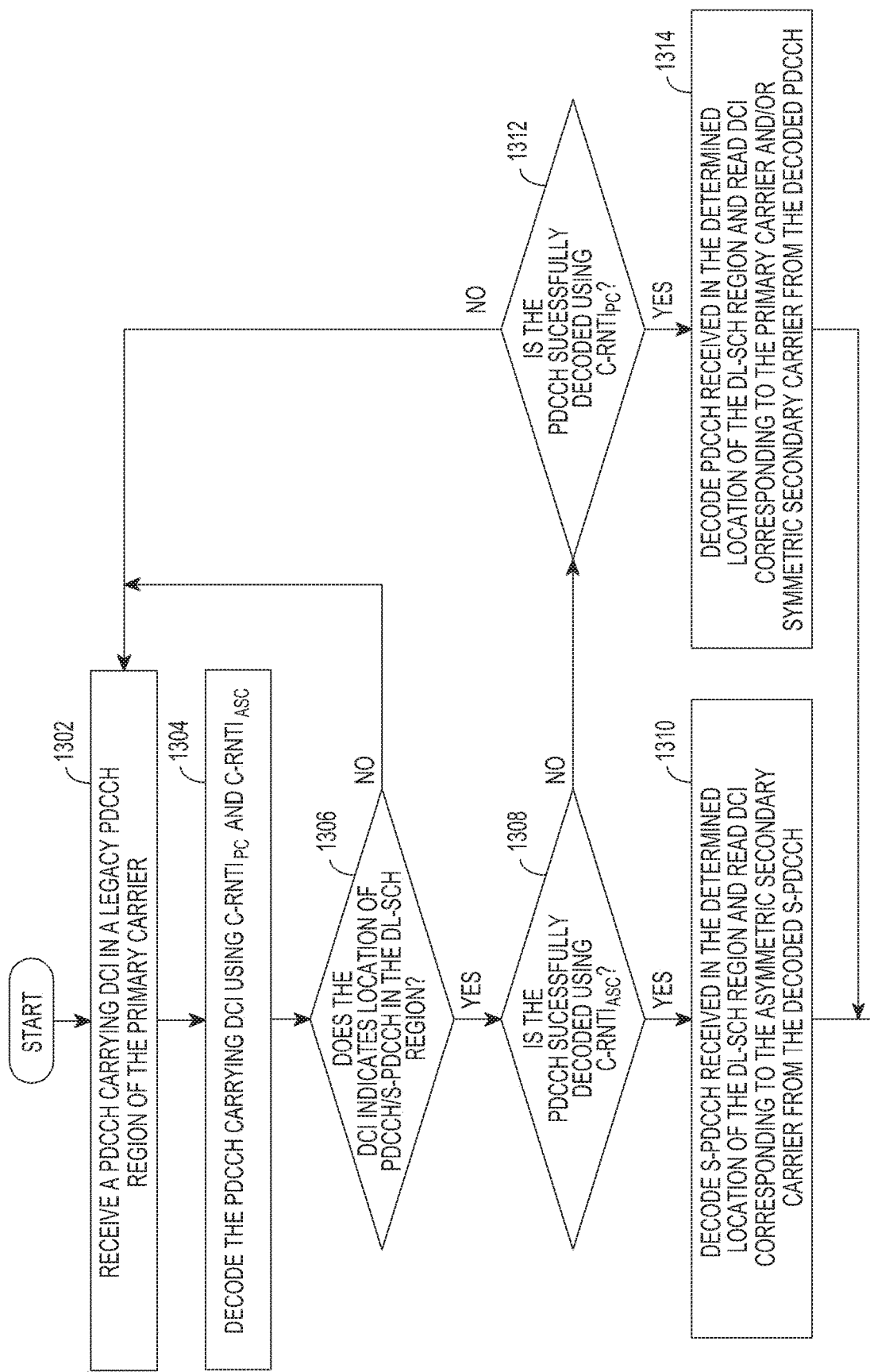
FIG. 13 is a flowchart illustrating a method of decoding unicast DCI received in a downlink control channel of a primary carrier according to an embodiment of the present disclosure.

FIG. 13 is a flowchart illustrating a method of decoding unicast DCI received in a downlink control channel of a primary carrier according to an embodiment of the present disclosure.

Referring to FIG. 13, at operation 1302, PDCCH carrying DCI is received in the legacy PDCCH region of a subframe of a radio frame on the primary carrier. At operation 1304, the PDCCH carrying the DCI is decoded using a temporary mobile station identifier (e.g., a C-RNTI assigned to the Primary Carrier (C-RNTIpc) or C-CRNTI assigned to the ASC (C-RNTI$_{ASC}$)).

At operation 1306, it is determined whether the DCI in the decoded PDCCH indicates location of PDCCH/S-PDCCH in a DL-SCH region of the primary carrier. If the DCI indicates location of PDCCH/S-PDCCH in the DL-SCH region, at operation 1308, it is determined whether the PDCCH carrying the DCI is successfully decoded using the C-RNTI assigned to the ASC C-RNTI$_{ASC}$. If the DCI does not indicate location of PDCCH/S-PDCCH, the process 1300 is routed to operation 1302.

If the PDCCH carrying the DCI is successfully decoded using the C-RNTI assigned to the asymmetric secondary carrier, it implies that the DCI indicates the location of the S-PDCCH. At operation 1310, the S-PDCCH received in the determined location of the DL-SCH region is decoded and DCI corresponding to the asymmetric secondary carrier is read from the decoded S-PDCCH. If the PDCCH carrying the DCI is successfully decoded using the C-RNTI assigned to the primary carrier, it implies that the DCI indicates the location of PDCCH. If it is determined at operation 1312 that the PDCCH carrying the DCI is successfully decoded using the C-RNTI assigned to the PC C-RNTIpc, the process proceeds to operation 1314. At operation 1314, PDCCH received in the determined location of the DL-SCH region is decoded and DCI corresponding to the primary carrier and/or the symmetric secondary carrier is read from the decoded PDCCH. In contrast, if it is determined at operation 1312 that the PDCCH carrying the DCI is not successfully decoded using the C-RNTI assigned to the PC C-RNTIpc, the process 1300 is routed to operation 1302.

Figure 14:
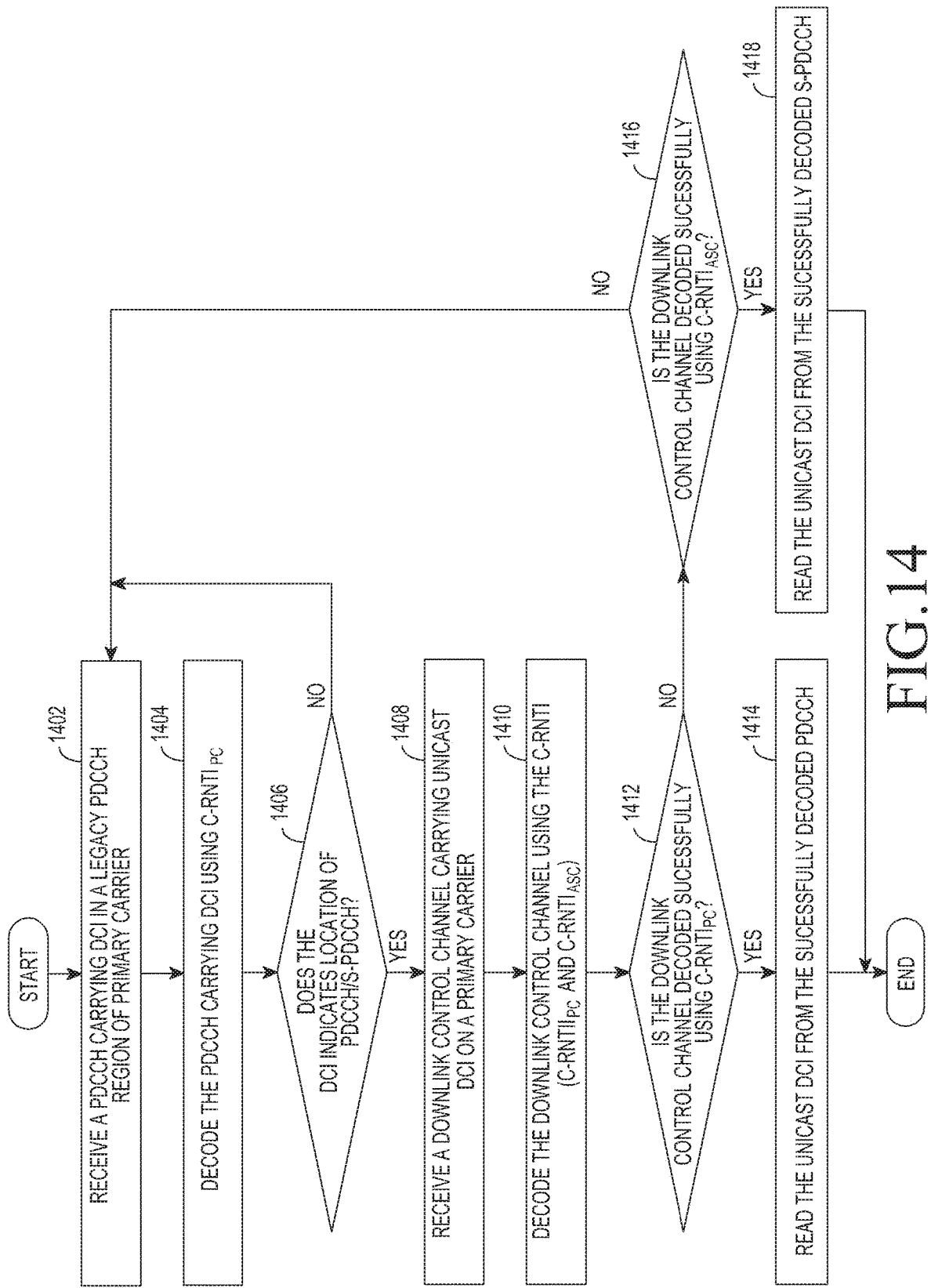
FIG. 14 is a flowchart illustrating a method of decoding unicast DCI received in a downlink control channel of a primary carrier according to an embodiment of the present disclosure.

FIG. 14 is a flowchart illustrating a method of decoding unicast DCI received in a downlink control channel of a primary carrier according to an embodiment of the present disclosure.

Referring to FIG. 14, at operation 1402, PDCCH carrying DCI is received in the legacy PDCCH region of a subframe of a radio frame on the primary carrier. At operation 1404, the PDCCH carrying the DCI is decoded using a temporary mobile station identifier (e.g., a C-RNTI assigned to the PC (C-RNTI$_{PC}$)).

At operation 1406, it is determined whether the DCI in the decoded PDCCH indicates location of PDCCH/S-PDCCH in a DL-SCH region of the primary carrier. If it is determined at operation 1406 that the DCI indicates location of PDCCH/S-PDCCH in the DL-SCH region, at operation 1408, downlink control channel is received in the determined location in the DL-SCH region. At operation 1410, the downlink control channel is decoded using C-RNTI assigned to the primary carrier and the C-RNTI assigned to the asymmetric secondary carrier. At operation 1412, it is determined whether the downlink control channel is successfully decoded using C-RNTI assigned to the primary carrier.

If it is determined at operation 1412 that the downlink control channel is decoded using the C-RNTI assigned to the primary carrier, it implies that that the downlink control channel received in the determined location of the DL-SCH region is a PDCCH carrying DCI corresponding to the primary carrier and/or the symmetric secondary carrier. At operation 1414, DCI corresponding to the primary carrier and/or the symmetric secondary carrier is read from the decoded PDCCH.

In contrast, if it is determined at operation 1412 that the downlink control channel cannot be successfully decoded using the C-RNTI assigned to the primary carrier, at operation 1416, it is determined whether the downlink control channel is successfully decoded using the C-RNTI assigned to the asymmetric secondary carrier. If the downlink control channel is successfully decoded using the C-RNTI assigned to the asymmetric secondary carrier, it implies that the downlink control channel received in the determined location of the DL-SCH region is an S-PDCCH carrying DCI corresponding to the asymmetric secondary carrier. At operation 1418, DCI corresponding to the primary carrier and/or the symmetric secondary carrier is read from the decoded S-PDCCH.

Figure 15:
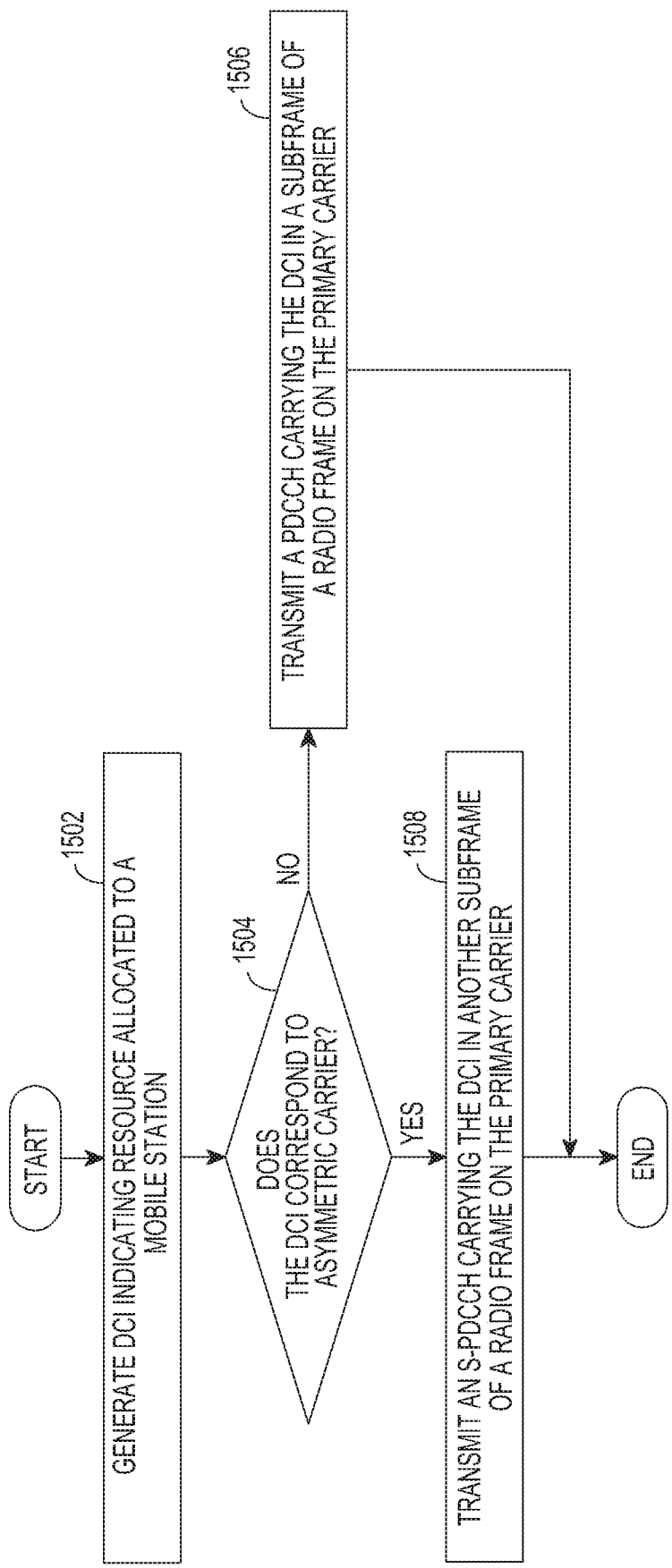
FIG. 15 is a flowchart illustrating a method of communicating unicast DCI in an asymmetric multicarrier communication network according to an embodiment of the present disclosure.

FIG. 15 is a flowchart illustrating a method of communicating unicast DCI in an asymmetric multicarrier communication network according to an embodiment of the present disclosure.

Referring to FIG. 15, at operation 1502, DCI indicating resources allocated to the mobile station 104 is generated. At operation 1504, it is determined whether the DCI corresponds an asymmetric secondary carrier.

If it is determined at operation 1504 that the DCI does not correspond to the asymmetric secondary carrier, at operation 1506, a PDCCH carrying the DCI corresponding to the primary carrier is transmitted in a subframe of a radio frame in the primary carrier, wherein the subframe is assigned for transmitting the PDCCH carrying the DCI corresponding to the primary carrier and/or symmetric secondary carrier. In contrast, if it is determined at operation 1504 that the DCI corresponds to the asymmetric secondary carrier, at operation 1508, an S-PDCCH carrying the DCI corresponding to the asymmetric secondary carrier is transmitted in another subframe of the radio frame in the primary carrier, wherein the subframe is assigned for transmitting the PDCCH carrying the DCI corresponding to the asymmetric secondary carrier. It can be noted that, PDCCH and S-PDCCH are transmitted in different subframes of a radio frame.

Figure 16:
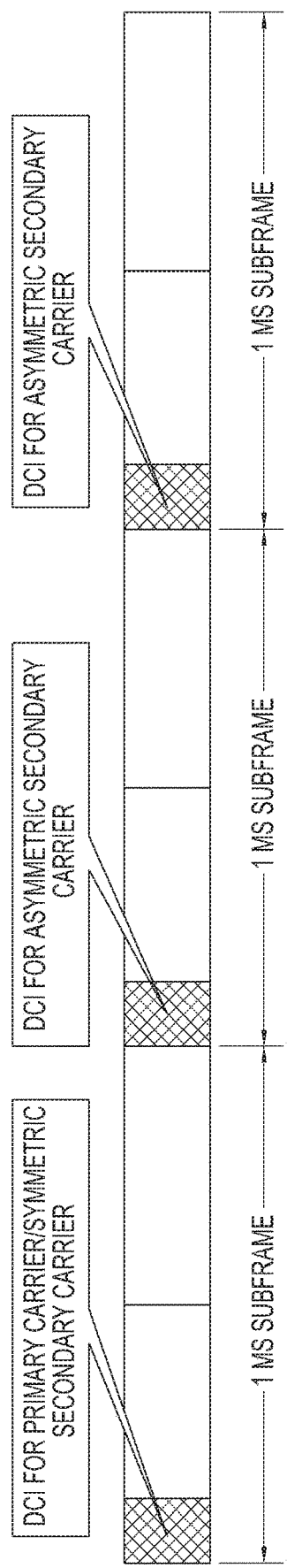
FIG. 16 is a schematic representation illustrating a transmission of a PDCCH and an S-PDCCH in a legacy PDCCH region of subframes of a radio frame according to an embodiment of the present disclosure.

FIG. 16 is a schematic representation illustrating a transmission of a PDCCH and an S-PDCCH in a legacy PDCCH region of subframes of a radio frame according to an embodiment of the present disclosure.

Referring to FIG. 16, a first subframe of a radio frame is dedicated for transmitting PDCCH carrying DCI for the primary carrier and the symmetric secondary carrier while a second subframe and a third subframe of the radio frame are dedicated for transmitting S-PDCCH carrying DCI for asymmetric secondary carrier. Accordingly, the base station 102 transmits PDCCH carrying DCI in a legacy PDCCH region of the first subframe and transmits S-PDCCH carrying DCI in a legacy PDCCH region of the second and third subframes.

In one embodiment of the present disclosure, one or more subframes in each radio frame dedicated for the primary carrier and/or the symmetric secondary carrier is indicated to the mobile station 104 using subframe number of the one or more subframes. In case one subframe per radio frame is dedicated for the primary carrier and/or the symmetric secondary carrier, subframe number is used to indicate the subframe for the primary carrier and/or the symmetric secondary carrier. In case multiple contiguous subframes per radio frame are dedicated for the primary carrier and/or the symmetric secondary carrier, starting subframe number and number of subframes are used to indicate the subframes dedicated for the primary carrier and/or the symmetric secondary carrier. Alternatively, a bitmap is used to indicate the subframes per radio frame dedicated for the primary carrier and/or the symmetric secondary carrier.

In another embodiment of the present disclosure, one or more sub frames across multiple radio frames dedicated for the primary carrier and/or the symmetric secondary carrier is indicated to the mobile station 104 using frame cycle, number for frames and frame offset. In one implementation, frames which satisfy equation: frame cycle mod 'number of frames'=frame offset has subframes dedicated for the primary carrier and/or the symmetric secondary carrier. The specific subframes of each radio frame are indicated using the subframe number.

In one implementation, information on the one or more subframes in each radio frame dedicated for the primary carrier and the symmetric secondary carrier is indicated in advance. In another implementation, the information on the one or more subframes in each radio frame dedicated for the primary carrier and/or the symmetric secondary carrier is indicated in broadcast information transmitted by the base station 102. In yet another implementation, information on the one or more subframes in each radio frame dedicated for the primary carrier and/or the symmetric secondary carrier is indicated when the asymmetric secondary carrier is activated for the mobile station 104. It can be noted that, information on the one or more subframes in each radio frame dedicated for the primary carrier and/or the symmetric secondary carrier can be modified by the base station. The base station may modify the information when connection for carrying traffic on the primary and/or the symmetric secondary carrier is established or released.

Figure 17:
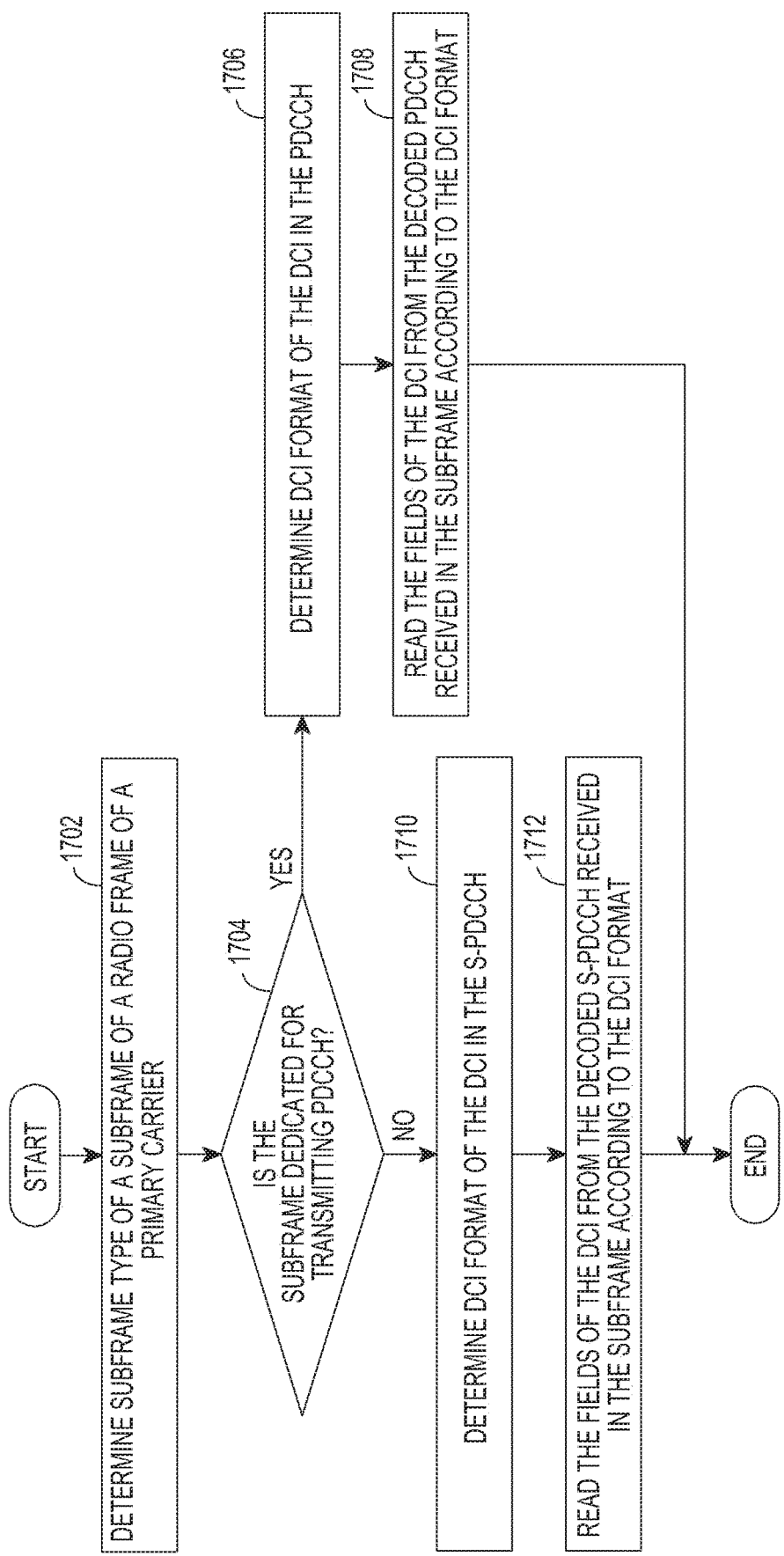
FIG. 17 is a flowchart illustrating a method of decoding unicast DCI received in a downlink control channel of a primary carrier according to an embodiment of the present disclosure.

FIG. 17 is a flowchart illustrating a method of decoding unicast DCI received in a downlink control channel of a primary carrier according to an embodiment of the present disclosure.

Referring to FIG. 17, at operation 1702, a subframe type of a subframe of a radio frame of a primary carrier is determined. At operation 1704, it is determined whether the subframe of the radio frame is dedicated for transmitting a PDCCH carrying DCI corresponding to the primary carrier and the symmetric secondary carrier. If it is determined at operation 1704 that the subframe is dedicated for transmitting a PDCCH carrying DCI corresponding to the primary carrier and the symmetric secondary carrier, at operation 1706, a DCI format of the DCI in the PDCCH is determined. At operation 1708, the fields of the DCI are read from the PDCCH received in the subframe according to the DCI format.

If it is determined at operation 1704 that the subframe is dedicated for transmitting S-PDCCH carrying DCI corresponding to the asymmetric secondary carrier, at operation 1710, a DCI format of the DCI in the S-PDCCH is determined. At operation 1712, the fields of the DCI are read from the S-PDCCH received in the subframe according to the DCI format.

Figure 18:
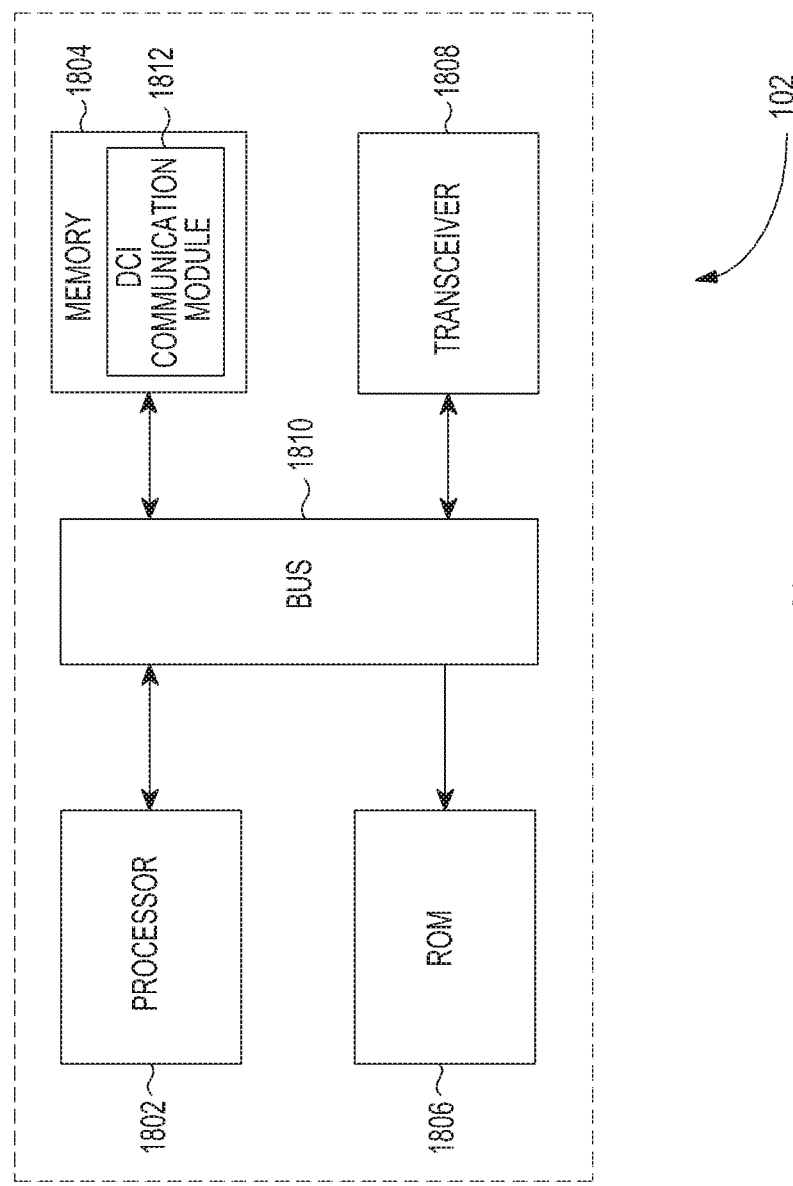
FIG. 18 is a block diagram of a base station illustrating various components according to an embodiment of the present disclosure.

FIG. 18 is a block diagram of a base station illustrating various components according to an embodiment of the present disclosure.

Referring to FIG. 18, the base station 102 includes a processor 1802, a memory 1804, a Read Only Memory (ROM) 1806, a transceiver 1808, and a bus 1810.

The processor 1802, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1802 may also include embedded controllers, such as generic or programmable logic devices or arrays, application specific integrated circuits, single-chip computers, smart cards, and the like.

The memory 1804 and the ROM 1806 may be a volatile memory and a non-volatile memory. The memory 1804 includes a DCI communication module 1812 for generating DCI corresponding to a primary carrier and/or a symmetric secondary carrier, or asymmetric secondary carrier and communicating the DCI to the mobile station based the carrier type, according to one or more embodiments described above. A variety of computer-readable storage media may be stored in and accessed from the memory elements. Memory elements may include any suitable memory device(s) for storing data and machine-readable instructions, such as a ROM, a Random Access Memory (RAM), an Erasable Programmable ROM (EPROM), an Electrically Erasable Programmable ROM (EEPROM), a hard drive, a removable media drive for handling compact disks, digital video disks, diskettes, magnetic tape cartridges, memory cards, and the like.

Various embodiments of the present disclosure may be implemented in conjunction with modules, including functions, procedures, data structures, and application programs, for performing tasks, or defining abstract data types or low-level hardware contexts. The DCI communication module 1812 may be stored in the form of machine-readable instructions on any of the above-mentioned storage media and may be executed by the processor 1802. For example, a computer program may include machine-readable instructions which when executed by the processor 1802, may cause the processor 1802 to generate DCI corresponding to a primary carrier and/or a symmetric secondary carrier, or asymmetric secondary carrier and communicate the DCI to the mobile station based the carrier type, according to the teachings and herein described embodiments of the present disclosure. In one embodiment of the present disclosure, the program may be included on a Compact Disk-ROM (CD-ROM) and loaded from the CD-ROM to a hard drive in the non-volatile memory.

The transceiver 1808 may be capable of transmitting the DCI to the mobile station. The bus 1810 acts as interconnect between various components of the base station 102.

Figure 19:
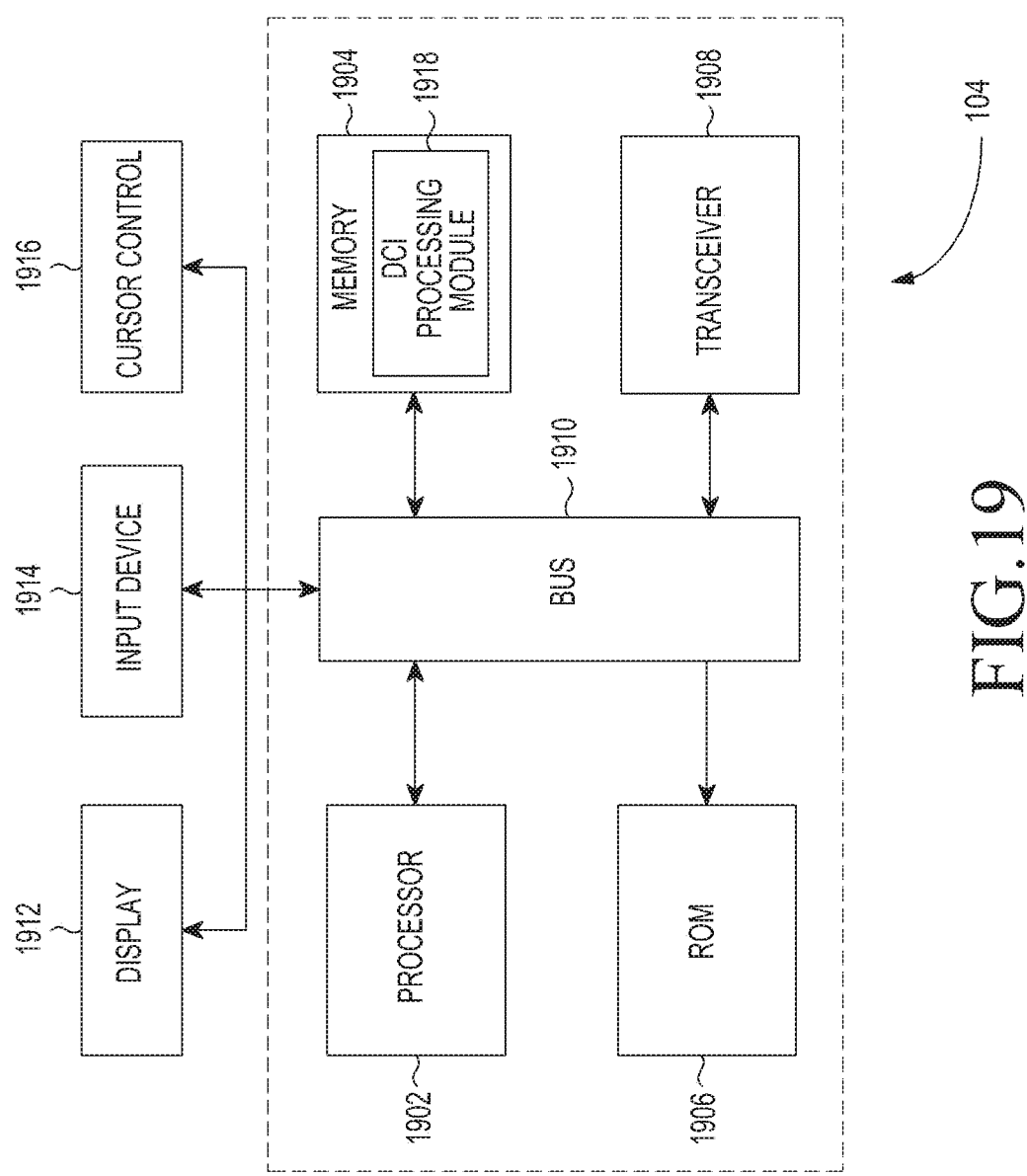
FIG. 19 is a block diagram of a mobile station illustrating according to an embodiment of the present disclosure.

FIG. 19 is a block diagram of a mobile station illustrating various components according to an embodiment of the present disclosure.

Referring to FIG. 19, the mobile station 104 includes a processor 1902, memory 1904, a ROM 1906, a transceiver 1908, a bus 1910, a display 1912, an input device 1914, and a cursor control 1916.

The processor 1902, as used herein, may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1902 may also include embedded controllers, such as generic or programmable logic devices or arrays, application specific integrated circuits, single-chip computers, smart cards, and the like.

The memory 1904 and the ROM 1906 may be a volatile memory and a non-volatile memory. The memory 1904 includes a DCI processing module 1918 for reading DCI corresponding to a carrier type from a downlink control channel received on a primary carrier, according to one or more embodiments described above. A variety of computer-readable storage media may be stored in and accessed from the memory elements. Memory elements may include any suitable memory device(s) for storing data and machine-readable instructions, such as a ROM, a RAM, an EPROM, an EEPROM, a hard drive, a removable media drive for handling compact disks, digital video disks, diskettes, magnetic tape cartridges, memory cards, and the like.

Various embodiments of the present disclosure may be implemented in conjunction with modules, including functions, procedures, data structures, and application programs, for performing tasks, or defining abstract data types or low-level hardware contexts. The DCI processing module 1918 may be stored in the form of machine-readable instructions on any of the above-mentioned storage media and may be executed by the processor 1902. For example, a computer program may include machine-readable instructions, that when executed by the processor 1902, cause the processor 1902 to read DCI corresponding to a carrier type from a downlink control channel received on a primary carrier, according to the teachings and herein described embodiments of the present disclosure. In one embodiment of the present disclosure, the computer program may be included on a CD-ROM and loaded from the CD-ROM to a hard drive in the non-volatile memory.

The transceiver 1908 may be capable of receiving a downlink control channel (e.g., a PDCCH or an S-PDCCH) carrying DCI corresponding to a primary carrier/symmetric secondary carrier or an asymmetric secondary carrier from the base station 102. The bus 1910 acts as interconnect between various components of the mobile station 104. The components, such as the display 1912, the input device 1914, and the cursor control 1916 are well known to the person skilled in the art and hence the explanation is thereof omitted.

The various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as an application specific integrated circuit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for communicating Downlink Control Information (DCI) in an asymmetric communication network, the method comprising:
   generating unicast DCI for transmitting the unicast DCI to a mobile station;
   identifying whether the unicast DCI includes control information for which carrier of a primary carrier, a symmetric secondary carrier and an asymmetric secondary carrier;
   transmitting the unicast DCI through a first downlink control channel on the primary carrier in a first time resource, when the unicast DCI includes control information on the primary carrier or the symmetric secondary carrier; and
   transmitting the unicast DCI through a second downlink control channel on the primary carrier in a second time resource, when the unicast DCI includes control information on the asymmetric secondary carrier,
   wherein each of frequencies of the primary carrier and the symmetric secondary carrier is lower than a frequency of the asymmetric secondary carrier, and
   wherein the symmetric secondary carrier is a carrier with a frame structure and operational parameters same as the primary carrier, and the asymmetric secondary carrier is a carrier with a frame structure and operational parameters different than the primary carrier.

2. The method of claim 1, further comprising:
   signaling information of at least one of the first time resource in which the unicast DCI including control information on one of the primary carrier or the symmetric secondary carrier is transmitted through the first downlink control channel; or
   signaling information of at least one of the second time resource in which the unicast DCI including control information on the asymmetric secondary carrier is transmitted through the second downlink control channel.

3. The method of claim 1, wherein the unicast DCI indicates information on resources allocated to the mobile station for a carrier type.

4. The method of claim 3, wherein the generating of the unicast DCI comprises:

encoding the unicast DCI in a first set of fields of a DCI format when a carrier type of the unicast DCI is one of the primary carrier or the symmetric secondary carrier; and encoding the unicast DCI in a second set of fields of the DCI format when the carrier type of the unicast DCI is the asymmetric secondary carrier.

5. The method of claim 1, wherein a sum of sizes of fields in a DCI format encoding the unicast DCI including control information on the asymmetric secondary carrier is equal to a sum of sizes of fields in the DCI format encoding the unicast DCI including control information on the primary carrier or the symmetric secondary carrier.

6. The method of claim 1, wherein the first downlink control channel is physical downlink control channel (PDCCH) and the second downlink control channel is secondary-PDCCH (S-PDCCH).

7. The method of claim 1, wherein the unicast DCI transmitted through the first downlink control channel is transmitted in a legacy physical downlink control channel (PDCCH) of the first time resource, and the unicast DCI transmitted through the second downlink control channel is transmitted in a legacy PDCCH of the second time resource.

8. An apparatus comprising:
a transceiver; and
at least one processor coupled to the transceiver,
wherein the at least one processor is configured to:
generate unicast downlink control information (DCI) for transmitting the unicast DCI to a mobile station, identify whether the unicast DCI includes control information for which carrier of a primary carrier, a symmetric secondary carrier and an asymmetric secondary carrier,
transmit the unicast DCI through a first downlink control channel on the primary carrier in a first time resource, when the unicast DCI includes control information on the primary carrier or the symmetric secondary carrier, and
transmit the unicast DCI through a second downlink control channel on the primary carrier in a second time resource, when the unicast DCI includes control information on the asymmetric secondary carrier,
wherein each of frequencies of the primary carrier and the symmetric secondary carrier is lower than a frequency of the asymmetric secondary carrier, and
wherein the symmetric secondary carrier is a carrier with a frame structure and operational parameters same as the primary carrier, and the asymmetric secondary carrier is a carrier with a frame structure and operational parameters different than the primary carrier.

9. The apparatus of claim 8, wherein the at least one processor is further configured to:
signal information of at least one of the first time resource in which the unicast DCI including control information on one of the primary carrier or the symmetric secondary carrier is transmitted through the first downlink control channel, or
signal information of at least one of the second time resource in which the unicast DCI including control information on the asymmetric secondary carrier is transmitted through the second downlink control channel.

10. The apparatus of claim 8, wherein the unicast DCI indicates information on resources allocated to the mobile station for a carrier type.

11. The apparatus of claim 10, wherein the at least one processor is further configured to:

encode the unicast DCI in a first set of fields of a DCI format when a carrier type of the unicast DCI is one of the primary carrier or the symmetric secondary carrier, and encode the unicast DCI in a second set of fields of the DCI format when the carrier type of the unicast DCI is the asymmetric secondary carrier.

12. The apparatus of claim 8, wherein a sum of sizes of fields in a DCI format encoding the unicast DCI including control information on the asymmetric secondary carrier is equal to a sum of sizes of fields in the DCI format encoding the unicast DCI including control information on the primary carrier or the symmetric secondary carrier.

13. The apparatus of claim 8, wherein the first downlink control channel is physical downlink control channel (PDCCH) and the second downlink control channel is secondary-PDCCH (S-PDCCH).

14. The apparatus of claim 8, wherein the unicast DCI transmitted through the first downlink control channel is transmitted in a legacy physical downlink control channel (PDCCH) of the first time resource, and the unicast DCI transmitted through the second downlink control channel is transmitted in a legacy PDCCH of the second time resource.

15. A method for communicating Downlink Control Information (DCI) in an asymmetric communication network, the method comprising:
receiving, from a base station, a first unicast DCI through a first downlink control channel on a primary carrier in a first time resource, wherein the first unicast DCI includes control information on the primary carrier or a symmetric secondary carrier; and
receiving, from the base station, a second unicast DCI through a second downlink control channel on the primary carrier in a second time resource, wherein the second unicast DCI includes control information on an asymmetric secondary carrier,
wherein each of frequencies of the primary carrier and the symmetric secondary carrier is lower than a frequency of the asymmetric secondary carrier, and
wherein the symmetric secondary carrier is a carrier with a frame structure and operational parameters same as the primary carrier, and the asymmetric secondary carrier is a carrier with a frame structure and operational parameters different than the primary carrier.

16. The method of claim 15, wherein the unicast DCI indicates information on resources allocated to a mobile station for a carrier type.

17. The method of claim 16,
wherein the unicast DCI is encoded in a first set of fields of a DCI format when a carrier type of the unicast DCI is one of the primary carrier or the symmetric secondary carrier, and
wherein the unicast DCI is encoded in a second set of fields of the DCI format when the carrier type of the unicast DCI is the asymmetric secondary carrier.

18. The method of claim 15, wherein a sum of sizes of fields in a DCI format encoding the unicast DCI including control information on the asymmetric secondary carrier is equal to a sum of sizes of fields in the DCI format encoding the unicast DCI including control information on the primary carrier or the symmetric secondary carrier.

19. The method of claim 15, wherein the first downlink control channel is physical downlink control channel (PDCCH) and the second downlink control channel is secondary-PDCCH (S-PDCCH).

20. The method of claim 15, wherein the unicast DCI transmitted through the first downlink control channel is transmitted in a legacy physical downlink control channel (PDCCH) of the first time resource, and the unicast DCI transmitted through the second downlink control channel is transmitted in a legacy PDCCH of the second time resource.

\* \* \* \* \*